(12) United States Patent
Akahane

(10) Patent No.: US 9,699,950 B2
(45) Date of Patent: Jul. 11, 2017

(54) LAWN-MOWING VEHICLE WITH OUTWARDLY AND UPWARDLY ROTATABLE LAWN-MOWING UNIT

(71) Applicant: IHI Shibaura Machinery Corporation, Matsumoto-shi, Nagano (JP)

(72) Inventor: Kazunari Akahane, Matsumoto (JP)

(73) Assignee: IHI Shibaura Machinery Corporation (JP)

( * ) Notice: Subject to any disclaimer, the term of this patent is extended or adjusted under 35 U.S.C. 154(b) by 0 days.

(21) Appl. No.: 14/875,972

(22) Filed: Oct. 6, 2015

(65) Prior Publication Data
US 2016/0106020 A1    Apr. 21, 2016

(30) Foreign Application Priority Data
Oct. 21, 2014 (JP) ................. 2014-214422

(51) Int. Cl.
| | | |
|---|---|---|
| A01D 34/00 | (2006.01) | |
| A01B 63/00 | (2006.01) | |
| A01D 34/66 | (2006.01) | |
| A01D 34/64 | (2006.01) | |

(52) U.S. Cl.
CPC ............ *A01B 63/008* (2013.01); *A01D 34/66* (2013.01); *A01D 2034/645* (2013.01)

(58) Field of Classification Search
CPC .... A01D 75/30; A01D 75/303; A01D 75/306; A01D 34/661; A01D 2034/654; A01D 67/00

USPC ......................................................... 56/15.2
See application file for complete search history.

(56) References Cited

U.S. PATENT DOCUMENTS

| | | | | |
|---|---|---|---|---|
| 4,497,160 A * | 2/1985 | Mullet | ................ | A01D 75/30 56/11.6 |
| 5,042,236 A * | 8/1991 | Lamusga | ............... | A01D 75/30 56/12.7 |
| 5,297,378 A * | 3/1994 | Smith | ................. | A01D 67/00 56/11.9 |
| 5,343,680 A * | 9/1994 | Reichen | ............... | A01D 75/30 56/249 |
| 5,715,667 A * | 2/1998 | Goman | ................. | A01D 75/30 56/13.6 |

(Continued)

FOREIGN PATENT DOCUMENTS

JP    2008-035816 A    2/2008

*Primary Examiner* — Árpád Fábián-Kovács
(74) *Attorney, Agent, or Firm* — Harness, Dickey & Pierce, P.L.C.

(57) ABSTRACT

A lawn-mowing vehicle is provided in which a facing-the-ground surface of a lawn-mowing unit can manually be shifted. The lawn-mowing units of the lawn-mowing vehicle can be rotated. There is provided a first connection mechanism that connects each of the lawn-mowing units to the arm, in such a way that the lawn-mowing units can be shifted by rotation between their work positions and the biased side positions that are biased toward the sides of the carriage. There is provided a second connection mechanism that connects each of the lawn-mowing units to the first connection mechanism so as to be rotatable, in such a way that the lawn-mowing units placed at the biased side positions can be shifted from a facing-the-ground posture to an outward posture.

12 Claims, 13 Drawing Sheets

(56) References Cited

U.S. PATENT DOCUMENTS

| | | | | |
|---|---|---|---|---|
| 5,771,669 | A * | 6/1998 | Langworthy | A01D 75/306 56/15.8 |
| 6,412,258 | B1 * | 7/2002 | Doerflinger | A01D 75/306 56/14.9 |
| 7,478,519 | B2 * | 1/2009 | Phillips | A01D 34/661 56/15.9 |
| 7,841,157 | B2 * | 11/2010 | Latuszek | A01D 34/661 56/228 |
| 7,971,415 | B2 * | 7/2011 | Phillips | A01D 75/306 56/6 |
| 8,209,946 | B2 * | 7/2012 | Neudorf | A01D 34/661 172/240 |
| 2005/0229567 | A1 * | 10/2005 | Phillips | A01D 75/306 56/7 |
| 2006/0174599 | A1 * | 8/2006 | Hironimus | A01D 75/303 56/6 |
| 2008/0127619 | A1 * | 6/2008 | Link | A01D 75/30 56/6 |
| 2008/0250767 | A1 * | 10/2008 | Boyko | A01B 73/044 56/14.7 |

\* cited by examiner

LAWN-MOWING VEHICLE WITH OUTWARDLY AND UPWARDLY ROTATABLE LAWN-MOWING UNIT

Priority is claimed under 35 U.S.C. 119 to Japanese Patent Application No. 2014-214422 filed on Oct. 21, 2014, which is hereby incorporated by reference in its entirety.

FIELD OF THE INVENTION

The present invention relates to a lawn-mowing vehicle.

BACKGROUND

Known is a lawn-mowing vehicle equipped with a lawn-mowing unit for mowing a lawn by turning a cutter blade, wherein the lawn-mowing vehicle is able to move the lawn-mowing unit by way of activating an up-and-down cylinder, between a moved-down position at a time of lawn-mowing and a moved-up position for placing the lawn-mowing unit at a time of driving a carriage in a non-working time period when no lawn-mowing is carried out. The lawn-mowing unit is located at a lower side of the carriage during a time period of lawn-mowing work and a non-working time period. Therefore, in the case of maintenance work for the lawn-mowing unit, a worker needs to crawl under the machine to make the maintenance work difficult.

In order to solve such a problem, PTL 1 (JP2008-35816A) discloses an arrangement; in which the lawn-mowing unit is displaced to a biased side position of the carriage, from the lower side of the carriage, and moreover a facing-the-ground surface of the lawn-mowing unit is oriented toward an outside of the carriage by way of activating an up-and-down cylinder, so as to make it possible to carry out the maintenance work for the facing-the-ground surface of the lawn-mowing unit.

Problem to be Solved

Unfortunately, in the case of the lawn-mowing vehicle described in PTL 1, for orienting the facing-the-ground surface of the lawn-mowing unit toward a lateral outside direction of the carriage, it is needed to activate the up-and-down cylinder, and it is difficult to manually change a posture of the lawn-mowing unit.

Then, the present invention is developed for solving such a problem, and it is an objective of the present invention to provide a lawn-mowing vehicle in which a facing-the-ground surface of a lawn-mowing unit can manually be oriented toward a lateral outside of the carriage.

SUMMARY OF INVENTION

In order to give a solution to the issue described above; the present invention provides a lawn-mowing vehicle with a lawn-mowing unit connected to a carriage by the intermediary of an arm; the lawn-mowing unit being able to move between a moved-down position as a position at a time of lawn-mowing, and a moved-up position as a position for driving the carriage in a time period when no lawn-mowing is carried out, by way of activating an up-and-down cylinder that connects the arm and the carriage; the lawn-mowing vehicle comprising: a first connection mechanism that makes it possible to rotate the lawn-mowing unit in a plane parallel with the ground surface, and connects the lawn-mowing unit to the arm, in such a way that the lawn-mowing unit can be shifted by rotation between its work position at the time of lawn-mowing and a biased side position that is biased toward a side of the carriage, being away from the work position; and a second connection mechanism for connecting the lawn-mowing unit to the first connection mechanism so as to be rotatable, in such a way that the lawn-mowing unit placed at the biased side position can be shifted from a facing-the-ground posture, which is a pose of a facing-the-ground surface of the lawn-mowing unit to face the ground, to an outward posture, which is a pose of the facing-the-ground surface to orient toward an outside of the carriage; wherein a connection part of the arm for connection to a movable end part of the up-and-down cylinder is an elongate hole.

Moreover, in addition to the above invention, it is preferable in the lawn-mowing vehicle that the lawn-mowing unit includes rollers that support the lawn-mowing unit against the ground at the time of lawn-mowing, while the rollers being rotatable in a traveling direction of the carriage; and the rollers are located at positions where the rollers contact with the ground at the time when the lawn-mowing unit is rotated from the facing-the-ground posture to the outward posture.

Moreover, in addition to the above invention, it is preferable that a longitudinal direction of the arm is placed in a direction perpendicular to the axis laid along the front-and-back direction of the carriage, and the biased side position is a position where the rotary shaft of the second connection mechanism in the lawn-mowing unit is oriented so as to be perpendicular to the longitudinal direction of the arm.

Moreover, in addition to the above invention, it is preferable in the lawn-mowing vehicle that the lawn-mowing vehicle has a rotation restricting means for restricting a rotation range of the lawn-mowing unit by use of the second connection mechanism; the second connection mechanism includes a first bracket fixed to the lawn-mowing unit, and a second bracket fixed to the first connection mechanism; and a shaft part for supporting the first bracket with the second bracket, so as to be rotatable; the second bracket is provided with a pin that can move backward and forward, in a direction toward a side where the first bracket is located; and there is formed a pin-insertion hole in the first bracket; wherein the pin-insertion hole faces the pin when the lawn-mowing unit is rotated until the rotation restricting means restricts the rotation, and at the time, the pin advances toward a side of the first bracket to get inserted into the pin-insertion hole.

Moreover, in addition to the above invention, it is preferable in the lawn-mowing vehicle that the lawn-mowing vehicle includes; a biasing means for biasing the pin toward a side of the first bracket; a catch part that is provided to the pin, and can be caught by a finger when the pin is moved against a biasing force in a direction for getting away from the first bracket; and a hook part that is provided to the second bracket, and to which the catch part is hitched under conditions where the pin is pulled out from the pin-insertion hole shaped in the first bracket, so that it becomes possible to prevent the pin from moving to the side of the first bracket.

In accordance with the present invention as described above, it is possible to provide the lawn-mowing vehicle in which the facing-the-ground surface of the lawn-mowing unit can manually be oriented toward the lateral outside of the carriage.

BRIEF DESCRIPTION OF THE DRAWINGS

FIG. 1 is equipped at its rear side.

FIG. 1 is equipped at its front side, under conditions where the lawn-mowing units are shifted to a moved-up position.

DESCRIPTION OF THE PREFERRED EMBODIMENT

A configuration of a lawn-mowing vehicle 1, as an example of an embodiment according to the present invention, is explained below with reference to the drawings.
General Configuration of the Lawn-Mowing Vehicle 1

Figure 1:
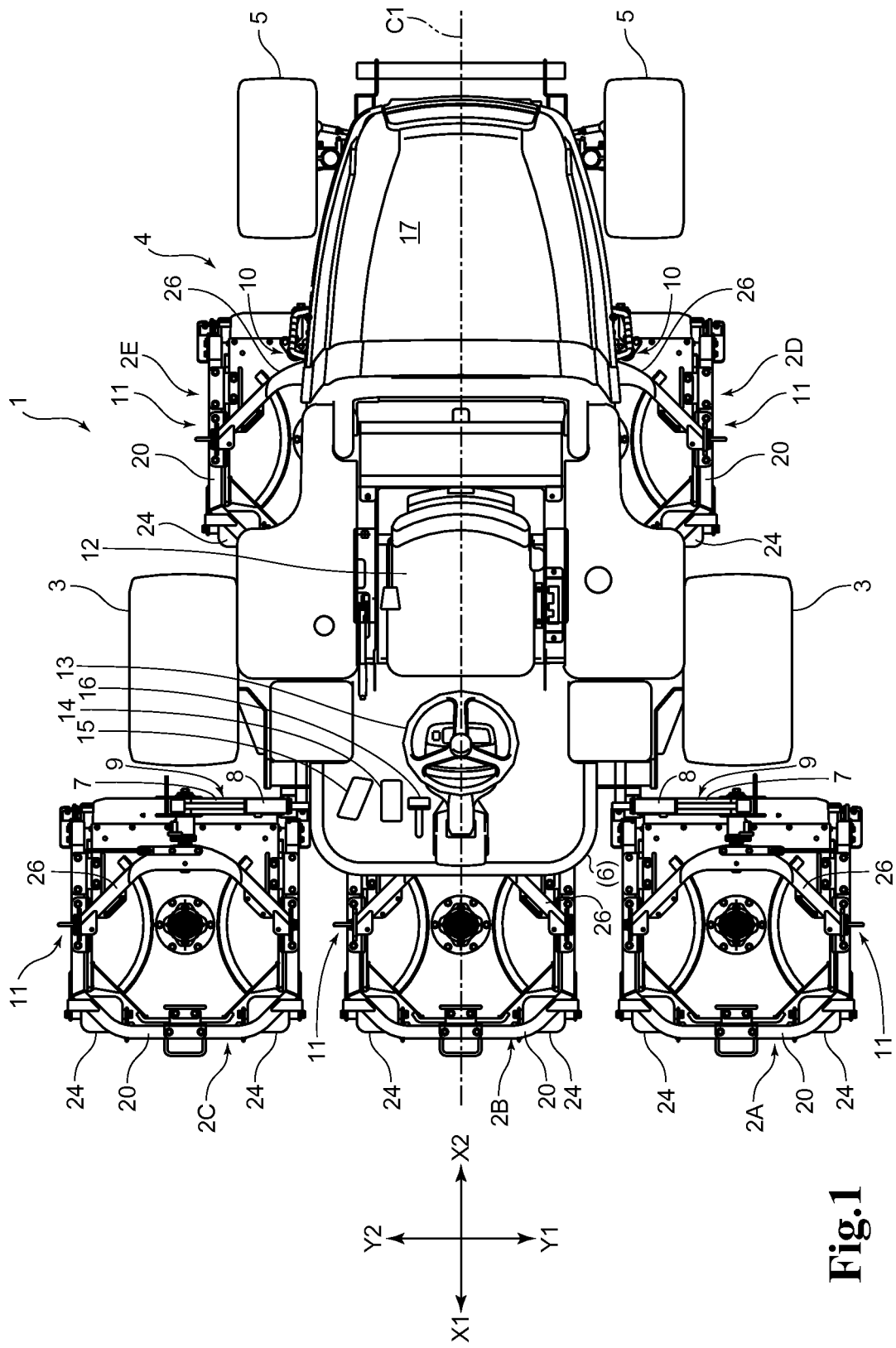
FIG. 1 is a drawing that shows a configuration of a lawn-mowing vehicle as an example of an embodiment according to the present invention in its external view, being a plan view of the lawn-mowing vehicle in a view from a top side.
Figure 2:
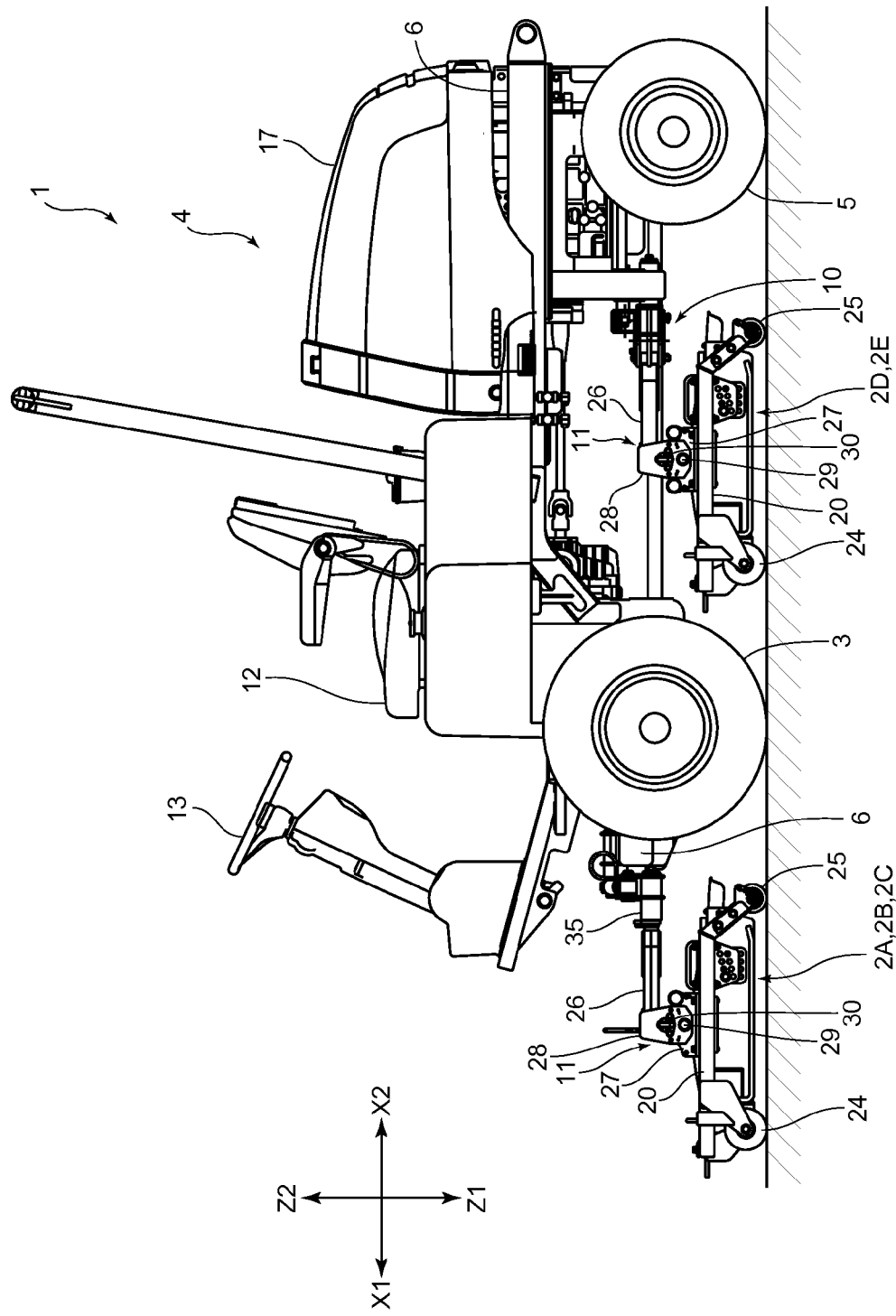
FIG. 2 is a drawing that shows a configuration of the lawn-mowing vehicle indicated on figure FIG. 1 in its external view, being a side view of the lawn-mowing vehicle in a view from a left-hand side.
Figure 3:
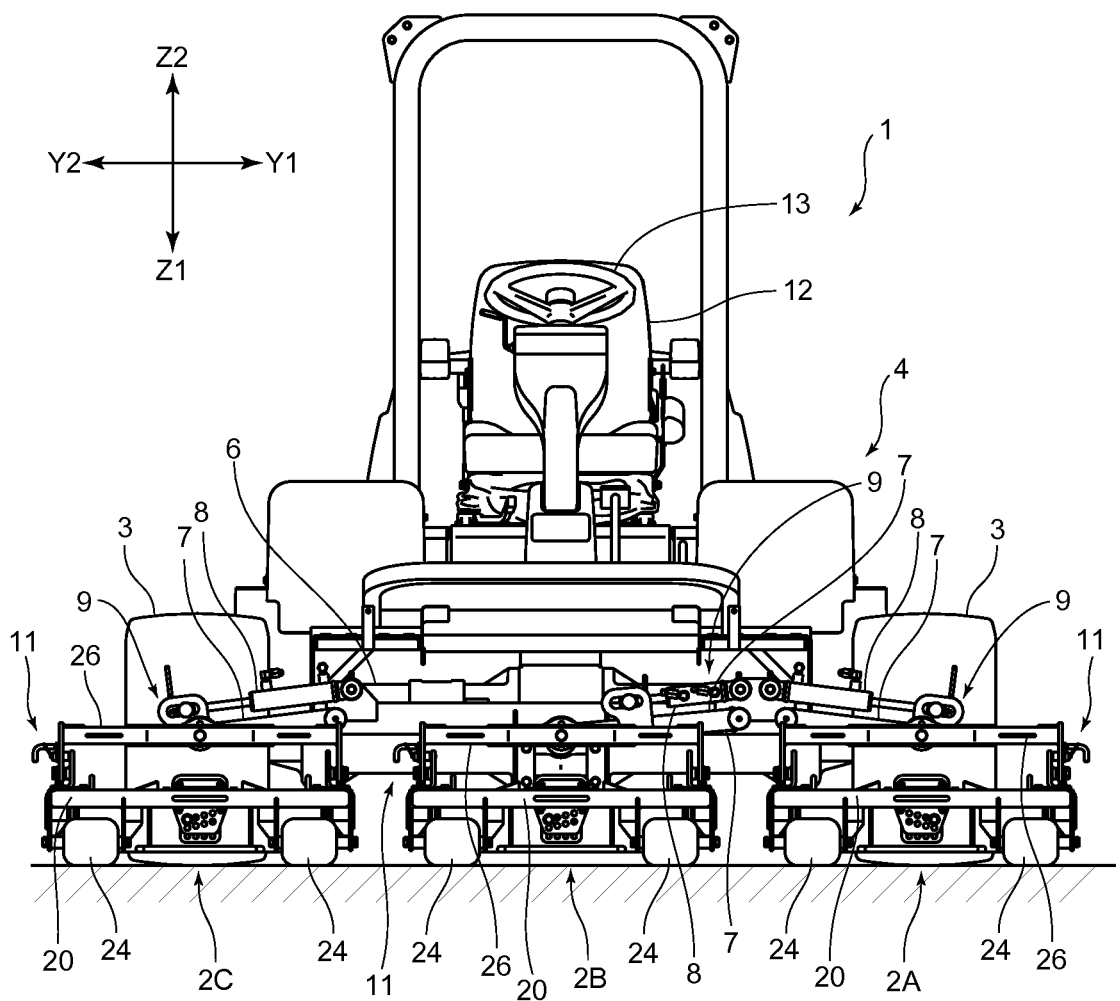
FIG. 3 is a drawing that shows a configuration of the lawn-mowing vehicle indicated on figure FIG. 1 in its external view, being a front elevation view of the lawn-mowing vehicle in a view from a front side.

FIG. 1 through FIG. 3 are drawings that show the configuration of the lawn-mowing vehicle 1 in its external view; wherein FIG. 1 is a plan view of the lawn-mowing vehicle 1 in a view from a top side, FIG. 2 is a side view of the lawn-mowing vehicle 1 in a view from a left-hand side, and FIG. 3 is a front elevation view of the lawn-mowing vehicle in a view from a direction of movement. Incidentally, each of FIG. 1 through FIG. 3 illustrates conditions of the lawn-mowing vehicle 1 at a time of lawn-mowing. In an explanation below, the explanation is made on the basis that a direction of forward movement (an arrow X1) of the lawn-mowing vehicle 1 is a front direction, a direction opposite to the direction described above (an arrow X2) is a rear direction, a left-hand side in a view toward the front direction (an arrow Y1) is a left side, and a right-hand side in a view toward the front direction (an arrow Y2) is a right side. Moreover, the explanation is made on the basis that a ground side direction (an arrow Z1) of the lawn-mowing vehicle 1 is a downward direction, and a direction opposite to the direction described above (an arrow Z2) is an upward direction.

As shown in FIG. 1 through FIG. 3, the lawn-mowing vehicle 1 includes five lawn-mowing units, 2A through 2E. In front of a pair of front wheels 3 at the right and left positions, three lawn-mowing units 2A through 2C are placed in a right-and-left direction at predetermined intervals. The lawn-mowing units 2A through 2C are placed on a line in a widthwise direction, perpendicular to an axis (an axis line C1) that passes through a center position between a right side and a left side of the carriage 4, and goes along a front-back direction (an X1-X2 direction) of the carriage. Moreover, two lawn-mowing units 2D and 2E are placed under the carriage 4 and between the front wheels 3 and a pair of rear wheels 5 at the right and left positions. The lawn-mowing units 2D and 2E are symmetrically located with respect to the axis line C1 of the carriage 4. The lawn-mowing units 2D and 2E at a rear side are individually positioned at each part corresponding to each of a gap between the lawn-mowing units 2A and 2B at the front side and another gap between the lawn-mowing units 2B and 2C at the same. The carriage 4 means a collective name for a carriage main body to which the lawn-mowing units 2A through 2E are connected.

Each of the lawn-mowing units 2A through 2E is fixed to a frame 6, as a structure frame for constituting the carriage 4, by means of an up-and-down link mechanism 9 including an arm 7 and an up-and-down cylinder 8, in such a way as to be movable up and down. The up-and-down link mechanism 9 is provided to each of the lawn-mowing units 2A through 2E. The arm 7 and the up-and-down cylinder 8 are so placed as to have their longitudinal direction oriented toward a direction perpendicular to the axis line C1. The up-and-down link mechanisms 9 provided to the lawn-mowing units 2A and 2C are placed in a nearly symmetrical relationship to each other, with respect to the axis line C1. Moreover, the up-and-down link mechanisms 9 provided to the lawn-mowing units 2D and 2E are also placed in a nearly symmetrical relationship to each other, with respect to the axis line C1. Each of the lawn-mowing units 2A through 2E is provided with a second connection mechanism 11, to be described later, in addition to the up-and-down link mechanism 9. Furthermore, each of the lawn-mowing units 2D and 2E is provided with a first connection mechanism 10, to be described later, in addition to the up-and-down link mechanism 9 and the second connection mechanism 11. Incidentally, the lawn-mowing units 2A and 2C are configured symmetrically in their arrangement, with respect to the axis line C1. Moreover, the lawn-mowing units 2D and 2E are also configured symmetrically in their arrangement, with respect to the axis line C1.

Almost at a center position of the carriage 4, there is placed a seat 12 where an operator (driver) sits down. A steering wheel 13 is provided at an elevated position in front of the seat 12. Moreover, as shown in FIG. 1, there are provided a forwarding accelerator pedal 14, a backwarding accelerator pedal 15, and a brake pedal 16 at a low position in front of the seat 12. When the operator sitting down on the seat 12 handles the steering wheel 13, a traveling direction of the lawn-mowing vehicle 1 is determined. Then, by means of the forwarding accelerator pedal 14, the backwarding accelerator pedal 15 and the brake pedal 16; a forwarding movement, a backwarding movement, a stop and a traveling speed of the lawn-mowing vehicle 1 are determined.

Employed for the lawn-mowing vehicle 1 is a four-wheel drive method in which four wheels of the front wheels 3 and the rear wheels 5 are driven by means of a hydraulic motor (not illustrated). The rear wheels 5 are able to change a traveling direction of the lawn-mowing vehicle 1 to right and left, in accordance with an angle of rotation of the steering wheel 13. In the lawn-mowing vehicle 1, the lawn-mowing units 2A through 2E are connected to the carriage 4. By way of activating the up-and-down cylinder 8 connected to the arm 7, being fixed to each of the lawn-mowing units 2A through 2E, with a link mechanism, each of the lawn-mowing units 2A through 2E can be shifted between a moved-down position as a position at the time of lawn-mowing and a moved-up position for placing the lawn-mowing unit at a time of driving a carriage 4 in a non-working time period when no lawn-mowing is carried out.

Although each of the lawn-mowing units 2A through 2C is not equipped with the first connection mechanism 10, as described above, and moreover each of the lawn-mowing units 2A through 2C has a different fixing position or a different fixing orientation for fixing the up-and-down link mechanism 9 to the frame 6, being compared with the lawn-mowing units 2D and 2E; the lawn-mowing units 2A through 2C have the same configuration as the lawn-mowing units 2D and 2E have. Then, the configuration of the lawn-mowing units 2D and 2E is explained below, with reference to FIG. 4 and FIG. 5.

Configuration of the Lawn-Mowing Units 2D and 2E

Figure 4:
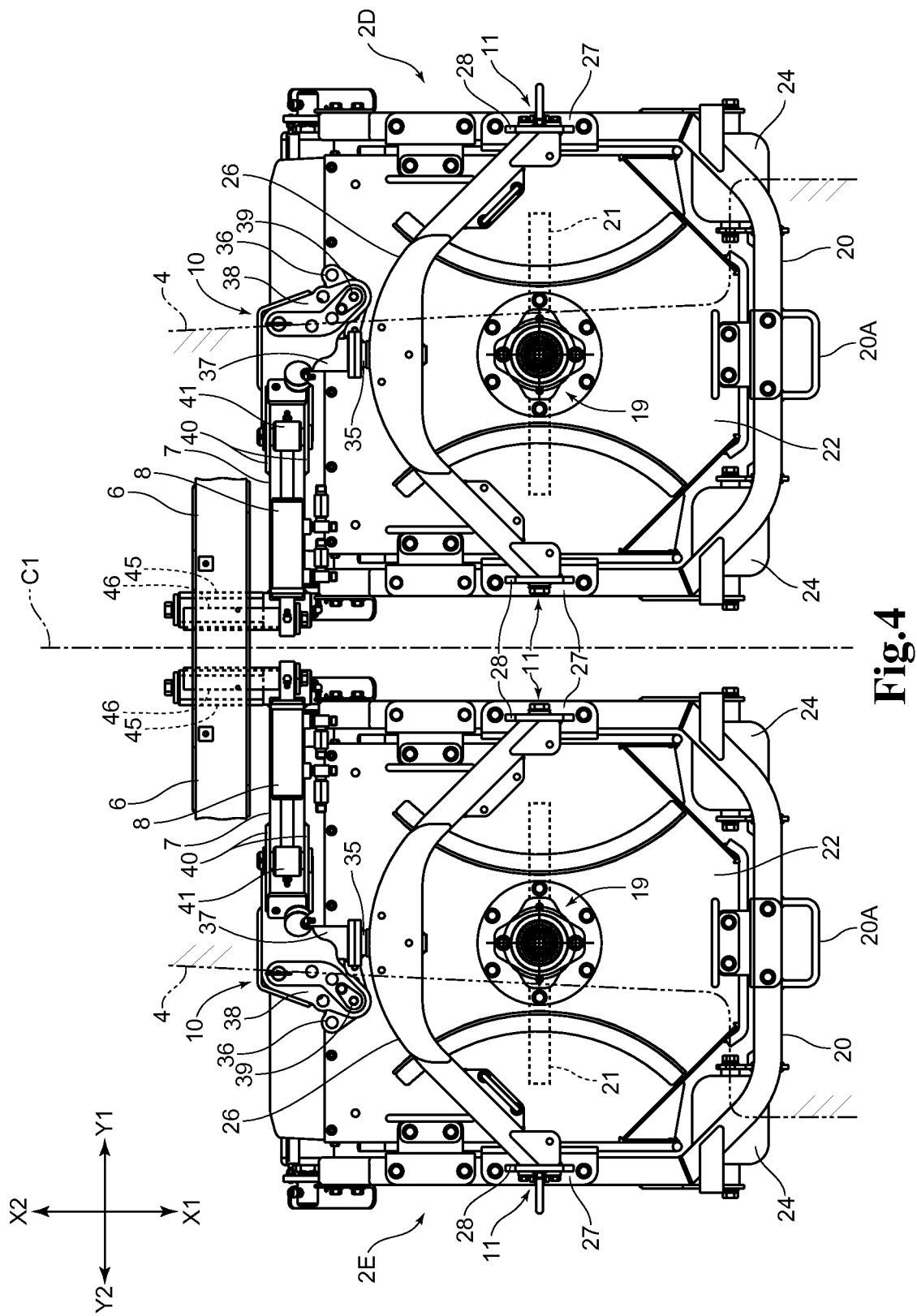
FIG. 4 is a plan view that shows a configuration of lawn-mowing units in a view from a top side, with which the lawn-mowing vehicle indicated on figure
Figure 5:
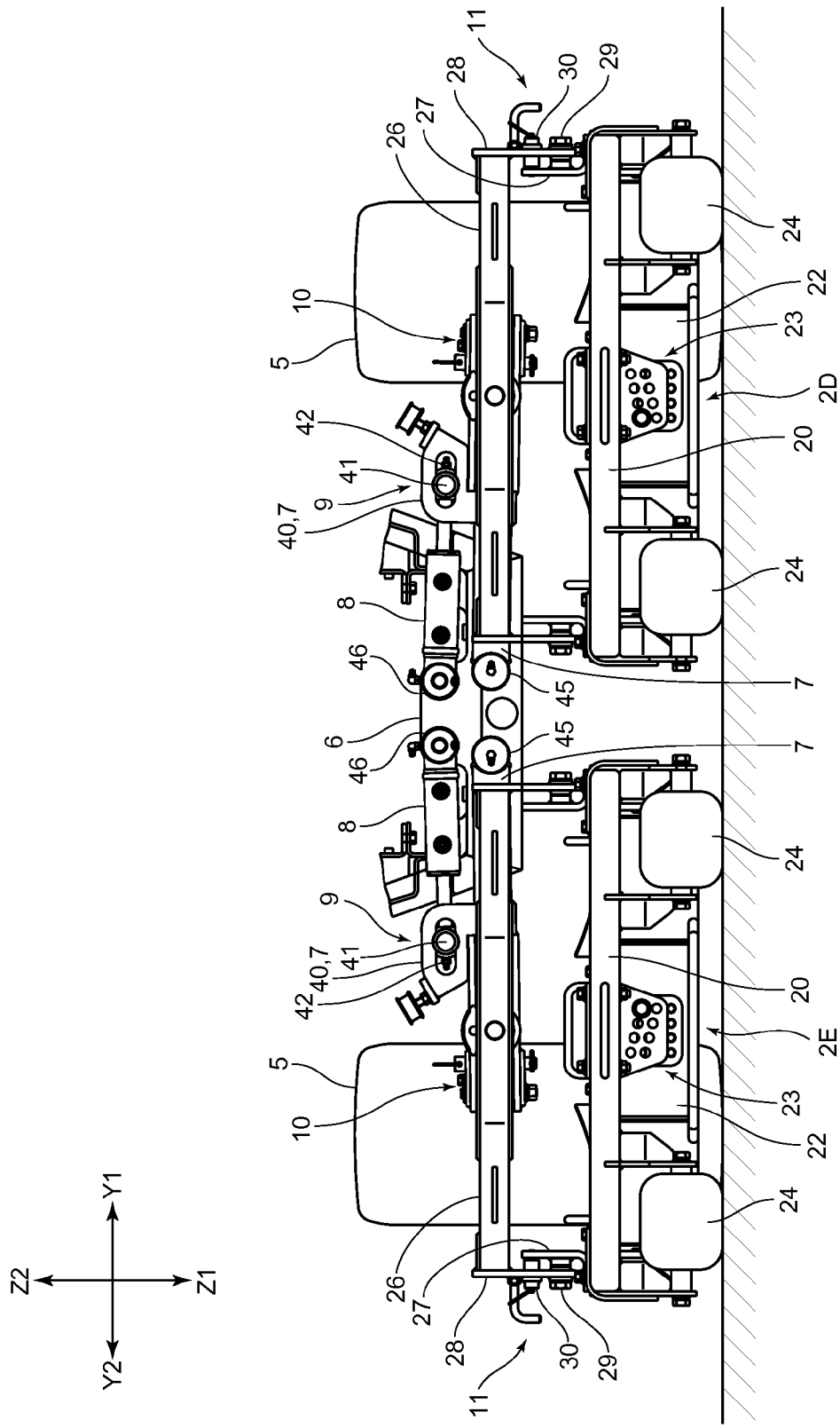
FIG. 5 is a front elevation view, in a view from a front side, which shows a configuration of the lawn-mowing units illustrated in FIG. 4.

FIG. 4 is a plan view that shows a configuration of the lawn-mowing units 2D and 2E placed at the rear side, in a view from a top side (the Z2 side), and FIG. 5 is a front elevation view, in a view from a front side (the X1 side), which shows a configuration of the lawn-mowing units 2D and 2E. In FIG. 4 and FIG. 5, the carriage 4 is not illustrated (in those drawings, part of the carriage 4 is shown with a two-dot chain line).

Each of the lawn-mowing units 2D and 2E includes a casing frame 20 shaped so as to be nearly a 'U'-formation in a plane view, a cutter blade 21, and a deck 22 that is bowl-shaped to have an opening at a lower side. The cutter blade 21 is housed inside the deck 22 so as to be rotatable. When the lawn-mowing units 2D and 2E are located at the moved-down position, the opening of the deck 22 faces the ground side in such a way that the cutter blade 21 can cut lawn coming into the deck 22 by way of the opening. The deck 22 is fixed to the casing frame 20 by the intermediary of an elevation adjusting mechanism 23 (refer to FIG. 5) to be described later. The elevation adjusting mechanism 23 can adjust an elevation of the deck 22 to one of a plurality of elevations with respect to the ground. Moreover, at a front end part (the X1 direction side) of the casing frame 20, there is fixed a handle 20A that can be grasped by hand when each the lawn-mowing units 2D and 2E is displaced to a biased side position of the carriage 4, or when each facing-the-ground surface of the lawn-mowing units 2D and 2E is shifted to take an outward posture that is a pose for facing an outside the carriage 4. The facing-the-ground surface of the lawn-mowing units 2D and 2E is a surface that includes the opening of the deck 22. Incidentally, the cutter blade 21 is so fixed as to be rotatable to a hydraulic motor 19.

At a front side of the casing frame 20 (the X1 direction side), a pair of front rollers 24 are fixed at the right and left positions so as to be rotatable. In the meantime, at a rear side of the casing frame 20 (the X2 direction side), a pair of rear rollers 25 (refer to FIG. 2) are fixed so as to be rotatable. Each of the front rollers 24 and the rear rollers 25 is independently rotatable. At the moved-down position at the time of lawn-mowing, the front rollers 24 and the rear rollers 25 contact with the ground in order to support the lawn-mowing units 2D and 2E against the ground, while being rotatable in a traveling direction of the carriage 4.

At an upper side of the casing frame 20 (the Z2 side), there is fixed a deck arm 26 that is curved so as to be nearly horseshoe-shaped in a plan view. The casing frame 20 is so fixed as to be rotatable to the deck arm 26 by means of the second connection mechanism 11. A first bracket 27 is provided to each of the right and left sides of the casing frame 20. Moreover, each of both ends of the deck arm 26 is equipped with a second bracket 28. The first bracket 27 is supported by the second bracket 28 so as to be rotatable by means of a rotary shaft 29. In other words, the casing frame 20 is fixed so as to be rotatable to the deck arm 26, by means of the first bracket 27, the second bracket 28 and the rotary shaft 29. These components of the first bracket 27, the second bracket 28 and the rotary shaft 29 constitute the second connection mechanism 11. The second connection mechanism 11 is connected to the arm 7 by way of the first connection mechanism 10. A structure of the first connection mechanism 10 is described later with reference to FIG. 8 through FIG. 11.

At a central part of a nearly horseshoe-shaped section (at an end part of the X2 side) of the deck arm 26, a support shaft 35 protrudes backward (in the X2 direction). The support shaft 35 is held on, being inserted in a shaft insertion sleeve 37 fixed to a link plate 36. The support shaft 35 is inserted in the shaft insertion sleeve 37 so as to be rotatable. The link plate 36 is fixed to the shaft insertion sleeve 37. Fixed to the arm 7 are link plate units 38. The link plate units 38 are provided in a pair, sandwiching the arm 7 in a vertical direction. The link plate 36 is located between the link plate units 38 provided in a pair in the vertical direction. The link plate 36 is supported by a rotary shaft 39, so as to be rotatable with respect to the link plate units 38. In other words, the lawn-mowing units 2D and 2E are connected to the arm 7 in such a way that the lawn-mowing units 2D and 2E can be shifted by rotation.

The arm 7 is provided with a connection plate unit 40, to which a movable end part of the up-and-down cylinder 8 lifted upward (in the Z2 direction) is connected. At the connection plate unit 40, there are provided two plates in the front-and-back direction, the two plates being parallel to each other (the same gap at right and left positions in the front-and-back direction) in a right-and-left direction (in the Y1-Y2 direction), as shown in FIG. 4; and between the two plates, there is placed a connection shaft 41 provided at the movable end part, which is one end side of the up-and-down cylinder 8. As shown in FIG. 5, a side surface part of the connection plate unit 40 is provided with an elongate hole 42 along a longitudinal direction of the arm 7 (the Y1-Y2 direction), the elongate hole 42 being used as a connection hole that can be connected to the connection shaft 41. The connection shaft 41 is a shaft component that stretches in a direction at right angle with a movement direction of the up-and-down cylinder 8. Then, both ends of the connection shaft 41 pass through the elongate hole 42 to protrude through each outside of the two plates; being fixed by way of a fixing means, such as a nut, at the protruding parts so as to be rotatable. In the meantime, the other end side of the up-and-down cylinder 8 is supported by the frame 6 so as to be rotatable, by the intermediary of a shaft 46. In other words, the up-and-down cylinder 8 connects the frame 6 and the arm 7. Moreover, a relationship between the elongate hole 42 and the connection shaft 41 at the time of lawn-mowing, as shown in FIG. 5, is set in such a way as to provide play (a clearance gap) both in an elongating direction as well as a contracting direction of the movable end part of the up-and-down cylinder 8.

At one end part of the up-and-down cylinder 8, wherein the end part being closer to the axis line C1 (refer to FIG. 4), the shaft 46 is fixed along the axis line C1, and the up-and-down cylinder 8 is fixed so as to be rotatable to the frame 6, by using the shaft 46 as a rotation center. In the meantime, at an end part of the arm 7, wherein the end part being closer to the axis line C1, a shaft 45 is fixed along beside the axis line C1, and the arm 7 is fixed so as to be rotatable to the frame 6, by using the shaft 45 as a rotation center. The up-and-down cylinder 8 is placed over the arm 7 in parallel; and each of the arm 7 and the up-and-down cylinder 8 is fixed so as to be rotatable at its corresponding one end part by using the shaft 45 and the shaft 46, respectively; wherein the two end parts are distantly located from each other. Moreover, at the other end part of the up-and-down cylinder 8, the connection shaft 41 is linked to the elongate hole 42 of the arm 7. In this way, the up-and-down link mechanism 9 is configured.

The lawn-mowing units 2D and 2E are connected to the carriage 4 (the frame 6) by the intermediary of the first connection mechanism 10 and the up-and-down link mechanism 9. The lawn-mowing units 2A through 2C at the front side can also be fixed to the carriage 4 (the frame 6) in the same way as the lawn-mowing units 2D and 2E at the rear side are. FIG. 1 through FIG. 5 illustrate conditions in which the lawn-mowing units 2A through 2E are located at their moved-down positions at the time of lawn-mowing. Explained next with reference to FIG. 6 and FIG. 7 are postures of the lawn-mowing units 2A through 2E at a time of driving a carriage 4 in a non-working time period.

When each of the lawn-mowing units 2A through 2E activates its up-and-down cylinder 8 in a direction for contracting the cylinder, the lawn-mowing unit changes its position from a moved-down position at a time of lawn-mowing to a moved-up position as a position for traveling, according to a contracting amount of the cylinder. At the time of moving up each of the lawn-mowing units 2A through 2E, the connection shaft 41 of the up-and-down cylinder 8 contacts an end surface of the elongate hole 42, at a side of the axis line C1 (refer to FIG. 4), in order to move the corresponding one of the lawn-mowing units 2A through 2E up to a predetermined elevation, by the intermediary of the arm 7. On the other hand, when the movable end part of the up-and-down cylinder 8 elongates, a corresponding one of the lawn-mowing units 2A through 2E can be moved down to its moved-down position at the time of lawn-mowing.

Figure 6:
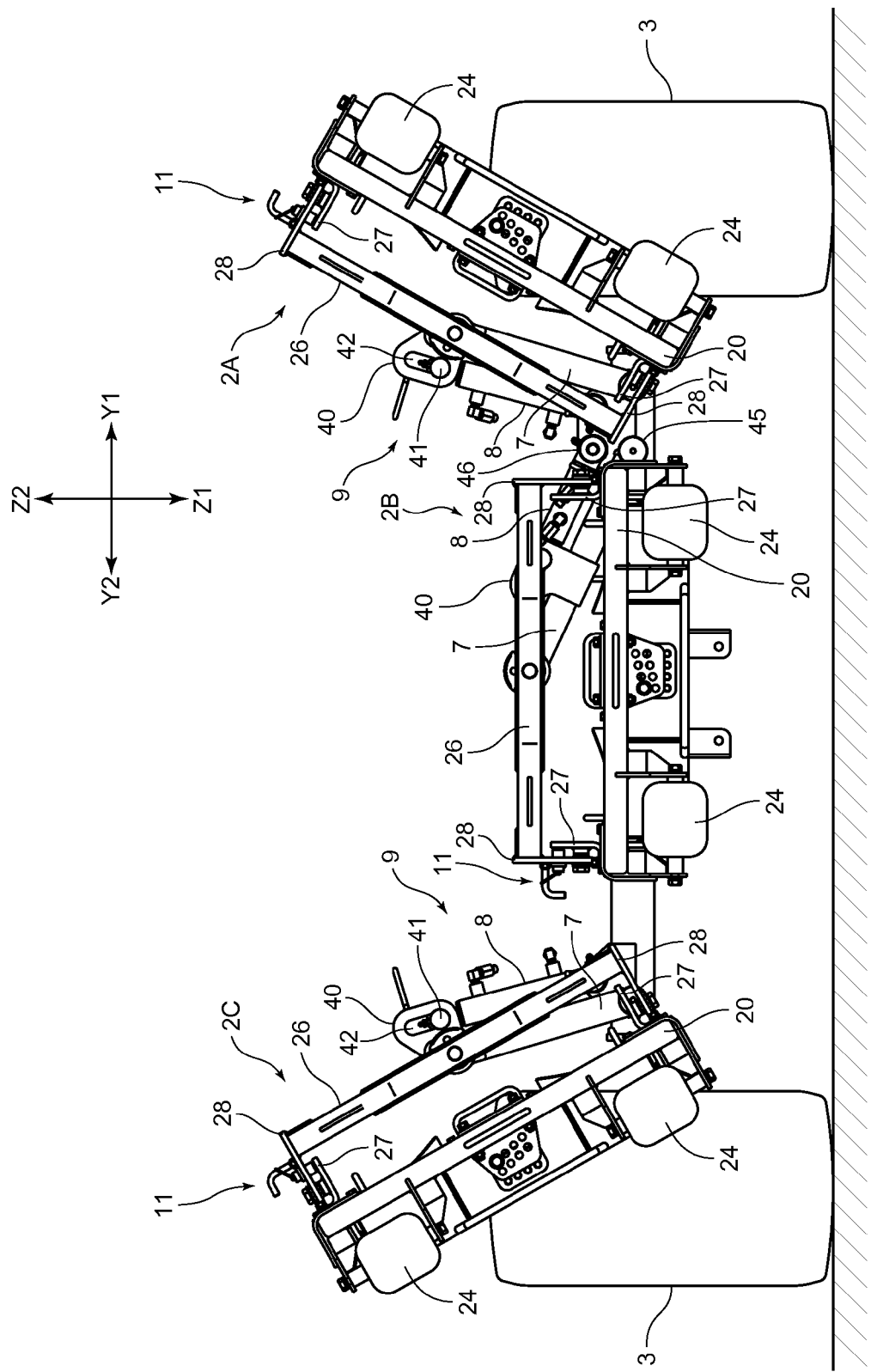
FIG. 6 is a front elevation view of lawn-mowing units, in a view from a front side, with which the lawn-mowing vehicle indicated on figure
Figure 7:
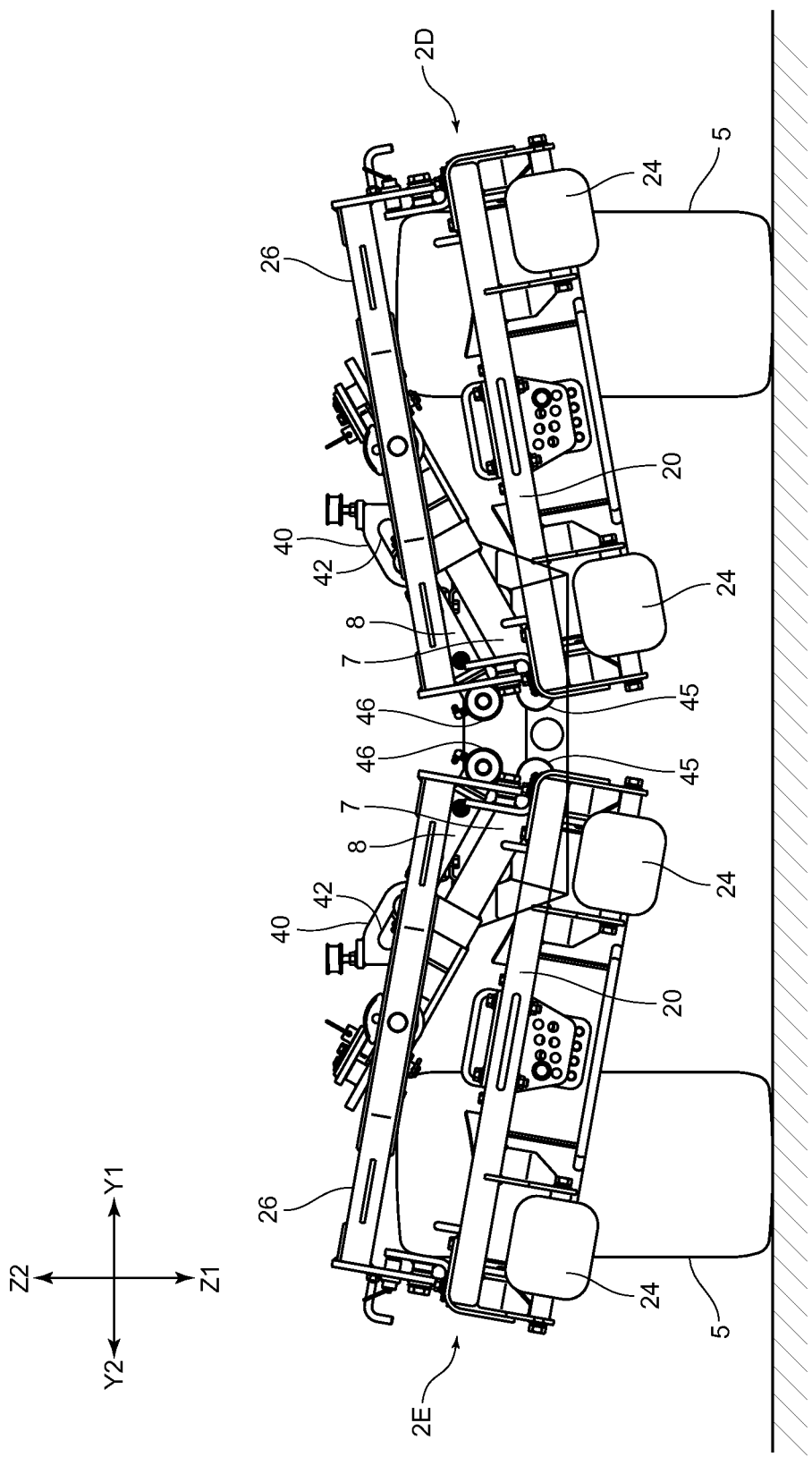
FIG. 7 is a front elevation view in a view from a front side, under conditions where the lawn-mowing units of the rear side are shifted to a moved-up position.

FIG. 6 is a front elevation view of the lawn-mowing units 2A through 2C at the front side, in a view from the front side (the X1 direction side), under conditions where the lawn-mowing units have been moved to their moved-up positions at the time of traveling in a non-working time period. Incidentally, an illustration of the carriage 4 is omitted in FIG. 6. By means of the up-and-down link mechanism 9, the lawn-mowing units 2A and 2C located at both the right and left sides are moved up to a position elevated away from the ground, and furthermore tilted sideward from the carriage 4. Moreover, the lawn-mowing unit 2B located at a center position has an overlap with the carriage 4 at a rear side, as shown in FIG. 1, and therefore the lawn-mowing unit 2B is moved up within a range having no contact with the carriage 4. As shown in FIG. 3, being compared with an elevation for connecting the arm 7 to the frame 6, an elevation for connecting the up-and-down cylinder 8 to the frame 6 is positioned higher. Therefore, by way of contracting the up-and-down cylinder 8, the lawn-mowing units 2A and 2C are moved up by the intermediary of the arm 7; and at the same time, the lawn-mowing units 2A and 2C can be shifted to take an outward posture at the side positions of the carriage 4.

With respect to an elevation from the ground, and a tilt angle of the outward posture, of each of the lawn-mowing units 2A through 2C, a contracting amount of each corresponding up-and-down cylinder 8 should be controlled. When the movable end part of the up-and-down cylinder 8 is elongated, a corresponding one of the lawn-mowing units 2A through 2C can return to the moved-down position where the front rollers 24 and the rear rollers 25 of the lawn-mowing unit contact with the ground. At the time when the lawn-mowing units 2A through 2C are at their moved-down position, the connection shaft 41 of the up-and-down cylinder 8 is almost located at a center position of the elongate hole 42. Therefore, each of the lawn-mowing units 2A through 2C can cope with a slope and undulation of the ground in the right-and-left direction, by using the shaft 45 of the arm 7 as a rotation center, within a range where the connection shaft 41 contacts the right and left end surfaces of the elongate hole 42 in a longitudinal direction.

FIG. 7 is a front elevation view in a view from the front side (the X1 direction side), under conditions where the lawn-mowing units 2D and 2E of the rear side are shifted to a moved-up position at the time of traveling in a non-working time period. Incidentally, an illustration of the carriage 4 is omitted in FIG. 7. An explanation is made by reference to FIG. 5 as well. In order to move up the lawn-mowing units 2D and 2E, a corresponding up-and-down cylinder 8 is contracted in the same way as for the lawn-mowing units 2A through and 2C of the front side. By way of further contracting the up-and-down cylinder 8 under conditions where the connection shaft 41 of the up-and-down cylinder 8 contacts an internal end surface of the elongate hole 42 of the arm 7, wherein the internal end surface being closer to the axis line C1 (refer to FIG. 4); the lawn-mowing units 2D and 2E move up while being tilted. With respect to an elevation from the ground, and a tilt angle, of each of the lawn-mowing units 2D and 2E, a contracting amount of each corresponding up-and-down cylinder 8 should be controlled. By way of elongating the up-and-down cylinder 8, it is possible to have the front rollers 24 and the rear rollers 25 of the lawn-mowing units 2D and 2E contact with the ground. As shown in FIG. 1, the lawn-mowing units 2D and 2E of the rear side are located under the carriage 4. Therefore, the lawn-mowing units 2D and 2E are moved up within a range having no contact with the carriage 4.

As explained above, by way of moving up the lawn-mowing units 2A through 2E in such a way that the lawn-mowing units are lifted away from the ground, the lawn-mowing vehicle 1 can be changed from a moved-down position for lawn-mowing to a moved-up position that enables traveling. Moreover, in a reverse manner, it is also possible to change to an opposite situation. At the time of maintenance work for an internal part of the deck 22 of the lawn-mowing units 2A through 2E; as far as the lawn-mowing units 2A and 2C are concerned, positioning the corresponding lawn-mowing unit to the moved-up position, as shown in FIG. 6, results in a posture for orienting the opening of the deck 22 outward, so that the maintenance work can easily be carried out. The lawn-mowing unit 2B can rotate in a front-back direction, with respect to the deck arm 26, by use of the rotary shaft 29 of the second connection mechanism 11. Therefore, as far as the lawn-mowing unit 2B is concerned, the maintenance work can easily be carried out by way of orienting the opening of the deck 22 frontward under conditions where the lawn-mowing unit 2B is located at the moved-up position. In the meantime, unfortunately a clearance between the ground and the lawn-mowing units 2D and 2E at the rear side is narrow as shown in FIG. 7. Accordingly, the maintenance work for the lawn-mowing units 2D and 2E is troublesome. Then, explained next are a configuration and a method with which the facing-the-ground surface of the lawn-mowing units 2D and 2E can take an outward posture with respect to the carriage 4.

Figure 8:
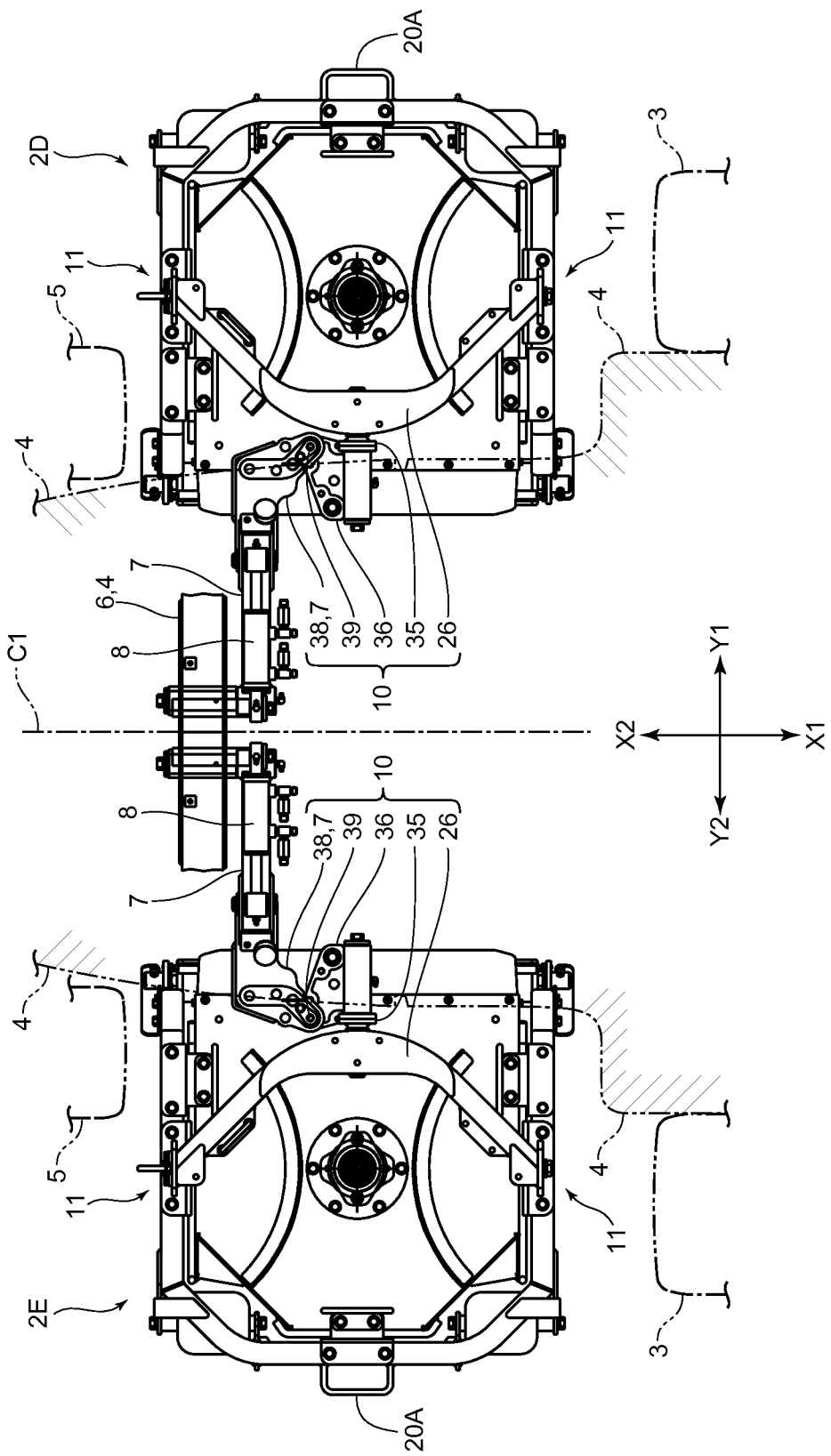
FIG. 8 is a plan view that shows conditions where the lawn-mowing units of the rear side are displaced to biased side positions of the carriage, by way of turning the lawn-mowing units, in a plane parallel with the ground, from positions for lawn-mowing.

FIG. 8 is a plan view that shows conditions where the lawn-mowing units 2D and 2E are displaced to biased side positions of the carriage 4, by way of turning the lawn-mowing units 2D and 2E, in a plane parallel with the ground, from positions for lawn-mowing shown in FIG. 4. The lawn-mowing unit 2D on the left-hand side (the Y1 side) is already turned counterclockwise in the drawing, by using the rotary shaft 39 of the first connection mechanism 10 as a rotation center. A "biased side position" means a position at which the rotary shaft 29 of the second connection mechanism 11 (refer to FIG. 5) orients at right angle with the longitudinal direction of the arm 7. In other words, it means a condition in which the second connection mechanism 11 of the lawn-mowing unit 2D orients at right angle with the axis line C1. The lawn-mowing unit 2E on the right-hand side is already turned clockwise in the drawing, by using the rotary shaft 39 of the first connection mechanism 10 as a rotation center. The lawn-mowing unit 2E is in a symmetrical relationship to the lawn-mowing unit 2D with respect to the axis line C1. The lawn-mowing unit 2D and the lawn-mowing unit 2E can manually be displaced to their biased side positions by way of grasping the handle 20A.

At the time of moving from their positions for lawn-mowing to the biased side positions, the lawn-mowing unit 2D and the lawn-mowing unit 2E do not come in contact with the carriage 4, the front wheels 3 and the rear wheels 5 (each of them is illustrated with a two-dot chain line). Moreover, a pair of the front rollers 24 as well as a pair of the rear rollers 25 contact with the ground while they are freely rotatable, and therefore no significant load arises at the time of moving to the biased side positions. The first connection mechanism 10, which makes it possible to displace the lawn-mowing unit 2D and the lawn-mowing unit 2E described above from their positions for lawn-mowing to the biased side positions, is explained next with reference to drawings. An explanation is made, with a drawing of the lawn-mowing unit 2E being illustrated.

Figure 9:
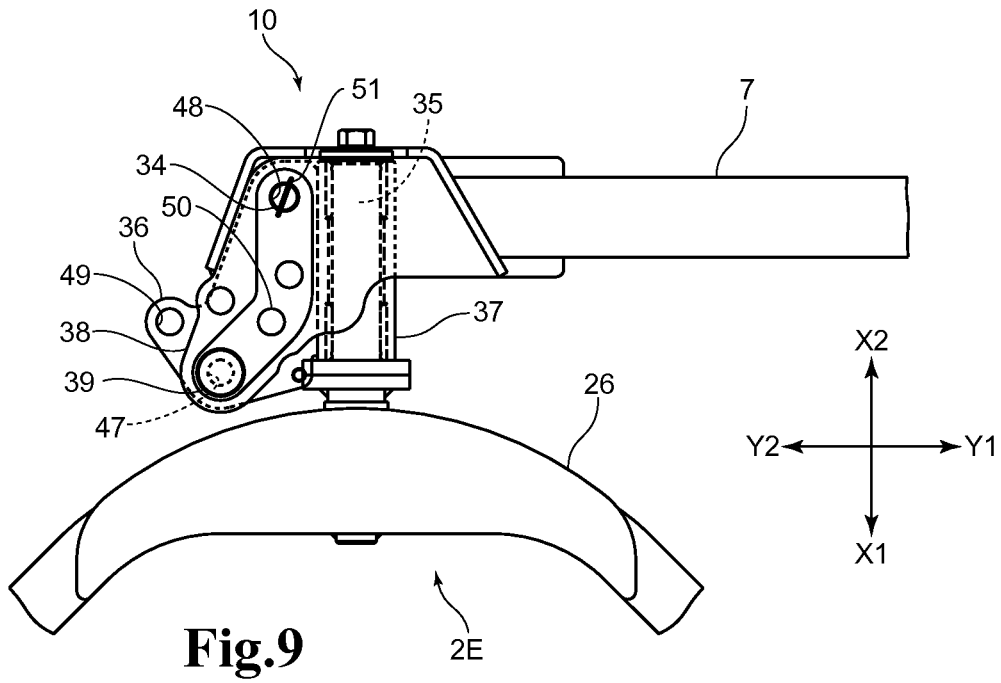
FIG. 9 is a plan view that shows a first connection mechanism at a time of lawn-mowing by a lawn-mowing unit of the rear side.

FIG. 9 is a plan view that shows the first connection mechanism 10 at a time of lawn-mowing by the lawn-mowing unit 2E. The link plate 36 is located between the two link plate units 38, provided in such a way as to sandwich the arm 7 in a vertical direction, and the link plate 36 is supported by the rotary shaft 39 that passes through a bore part 47 provided in common. Moreover, a pin 34 is inserted into a bore part 48 provided at a position away from the bore part 47. The bore part 48 is provided in common with the link plate units 38 and the link plate 36. Accordingly, by means of insertion of the pin 34 into the bore part 48, a positional relationship between the link plate units 38 and the link plate 36, in a direction parallel with the ground, is so fixed as to be shown in FIG. 9. The pin 34 can be removed/inserted from/into the bore part 48. If the pin 34 is removed away, the lawn-mowing unit 2E becomes rotatable by using the rotary shaft 39 as a rotation center. The link plate units 38 of the arm 7 are provided with a bore part 50. Meanwhile, the link plate 36 is provided with a bore part 49. The bore part 49 and the bore part 50 are those to be used for maintaining their fixed postures at the time when the lawn-mowing unit 2E is displaced to the biased side position. Incidentally, in the lawn-mowing unit 2E, the support shaft 35 protruding from the deck arm 26, by the intermediary of the deck arm 26 is inserted into the shaft insertion sleeve 37 fixed to the link plate 36, so as to be rotatable.

Figure 10:
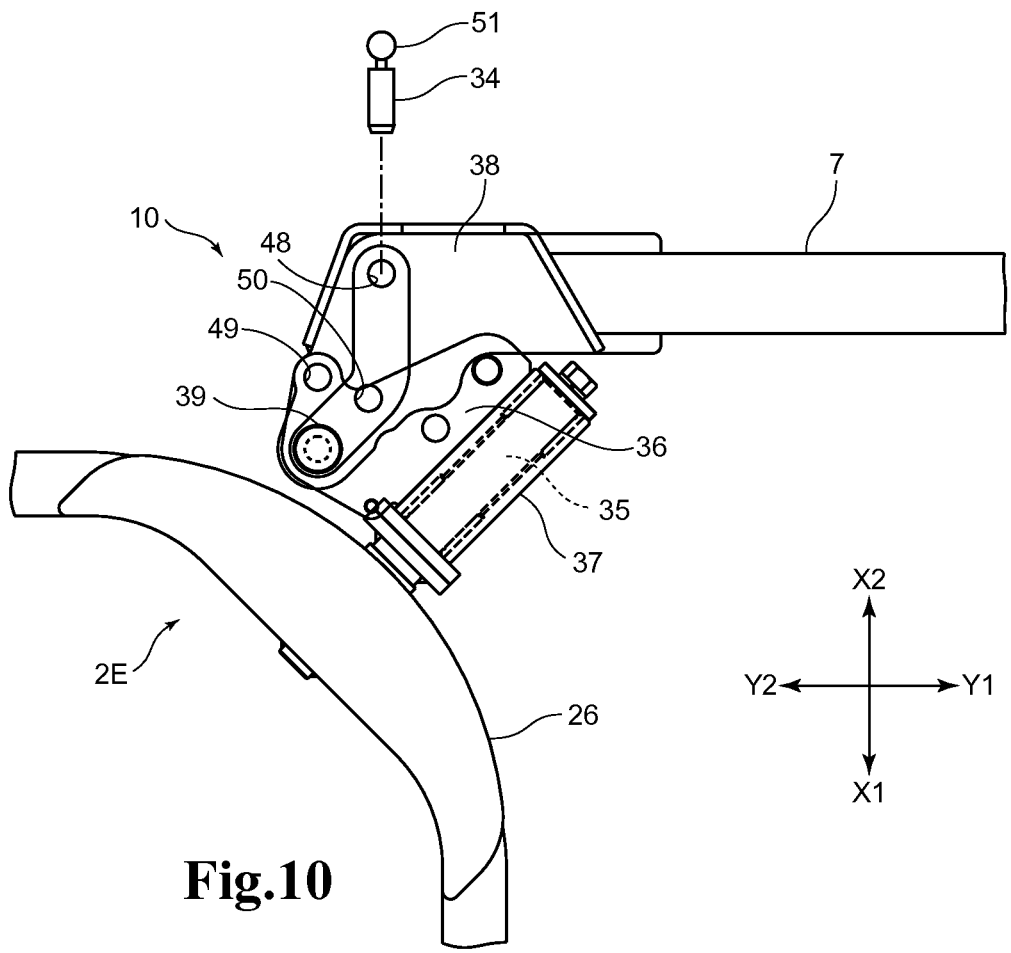
FIG. 10 is a plan view that shows the first connection mechanism, in the middle of shifting the lawn-mowing unit of the rear side from a position for lawn-mowing to a biased side position.
Figure 11:
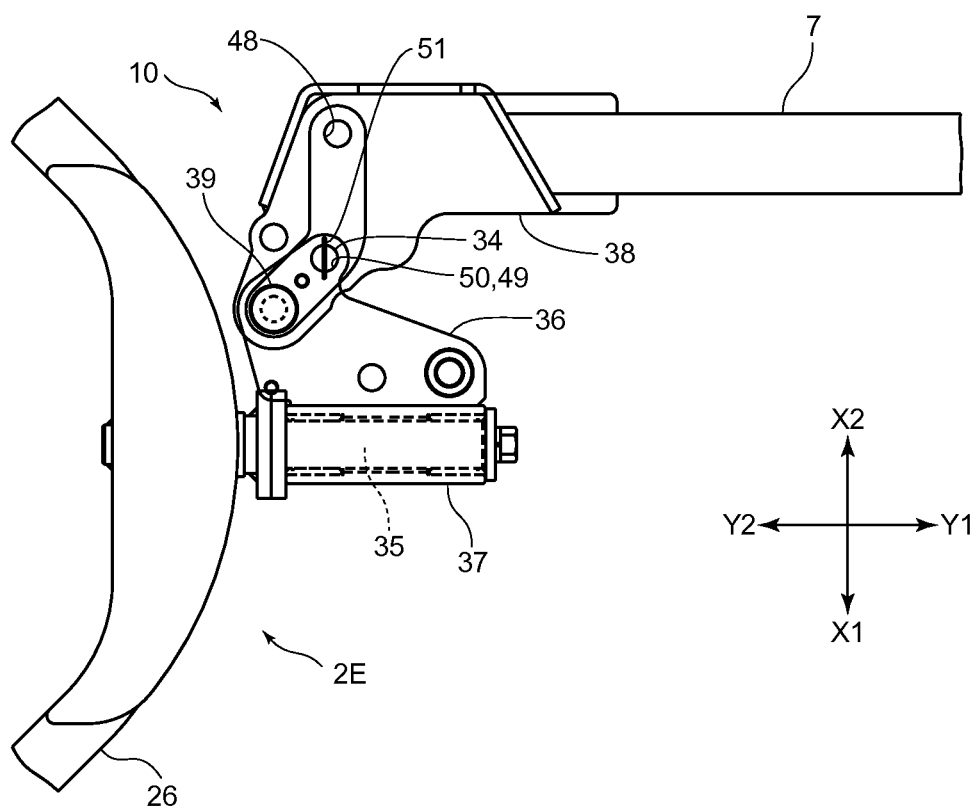
FIG. 11 is a plan view that shows the first connection mechanism, after the lawn-mowing unit of the rear side is shifted to the biased side position.

FIG. 10 is a plan view that shows the first connection mechanism 10, in the middle of shifting the lawn-mowing unit 2E from the position for lawn-mowing shown in FIG. 9, to the biased side position shown in FIG. 11. At first, the pin 34 is plucked out from the first connection mechanism 10 by such a way of hitching a finger to a ring 51 as a pin catch part. Subsequently, when the lawn-mowing unit 2E is turned clockwise in the drawing by use of the handle 20A (refer to FIG. 4) etc., the lawn-mowing unit 2E rotates by the intermediary of the shaft insertion sleeve 37, which is unified together with the link plate 36, while using the rotary shaft 39 as a rotation center.

FIG. 11 is a plan view that shows the first connection mechanism 10, after the lawn-mowing unit 2E is shifted to the biased side position. The lawn-mowing unit 2E is turned by using the rotary shaft 39 as a rotation center; and when it is visually recognized that the bore part 49 provided in the link plate 36 meets the bore part 50 provided in the link plate unit 38 of the arm 7, the pin 34 is inserted through the bore part 50 and the bore part 49. According to this arrangement, a position of the lawn-mowing unit 2E is determined to be at the biased side position by means of the rotary shaft 39 and the pin 34. Also, in the case of the lawn-mowing unit 2D, by way of turning the unit counterclockwise in an equivalent way to the way for the lawn-mowing unit 2E, the lawn-mowing unit 2D can be shifted to the biased side position. In other words, the positions of the lawn-mowing units 2D and 2E can be changed to the biased side positions, as shown in FIG. 8. Then, at the positions, the facing-the-ground surface of each of the lawn-mowing units 2D and 2E can be changed so as to take an outward posture by use of the second connection mechanism 11, in such a way as to orient the outward of the carriage 4.

Figure 12B:
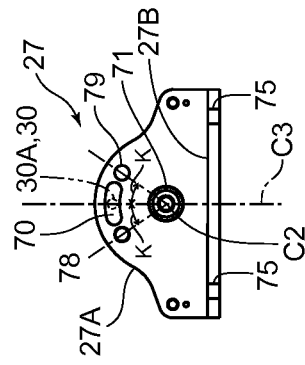
FIGS. 12(A) and 12(B) show a second connection mechanism; wherein a left section 12(A) is a rear view of a lawn-mowing unit in a view from a rear side, at a time when the lawn-mowing unit is placed to the biased side position, and meanwhile a right section 12(B) is a rear view that shows a first bracket.
Figure 12A:
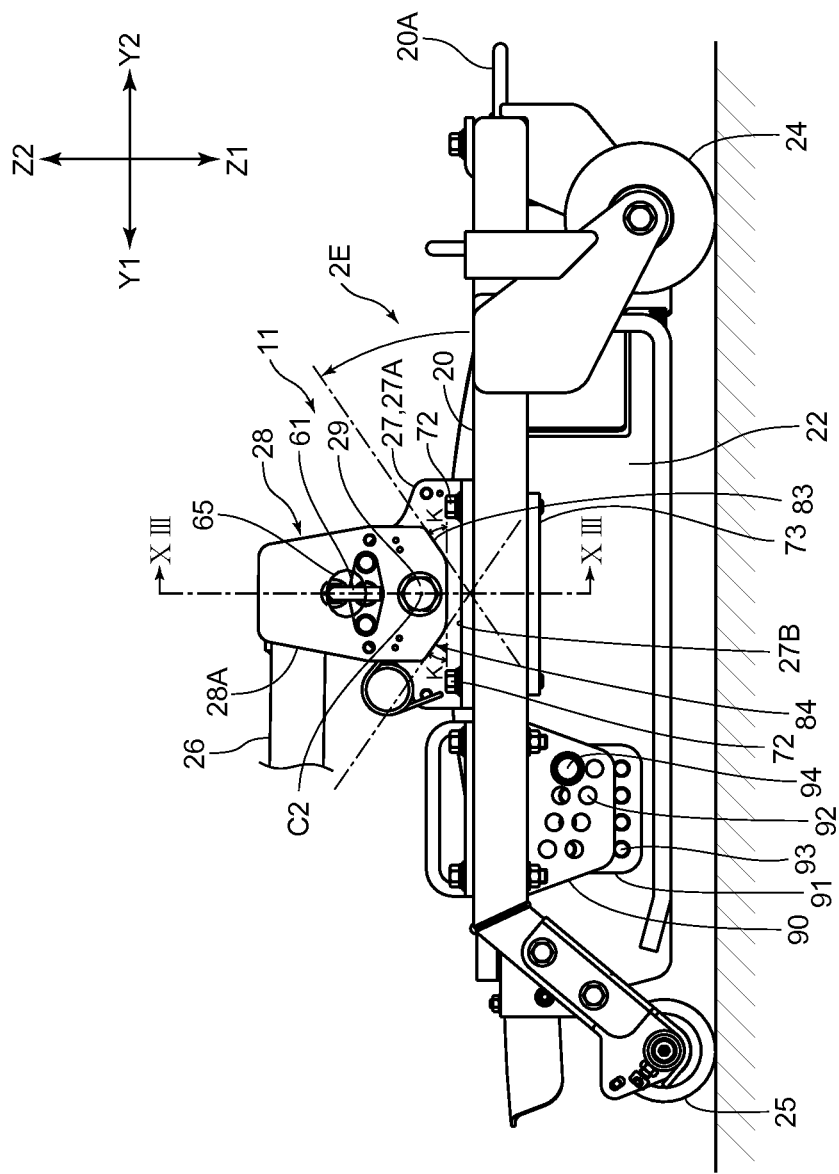
Figure 13:
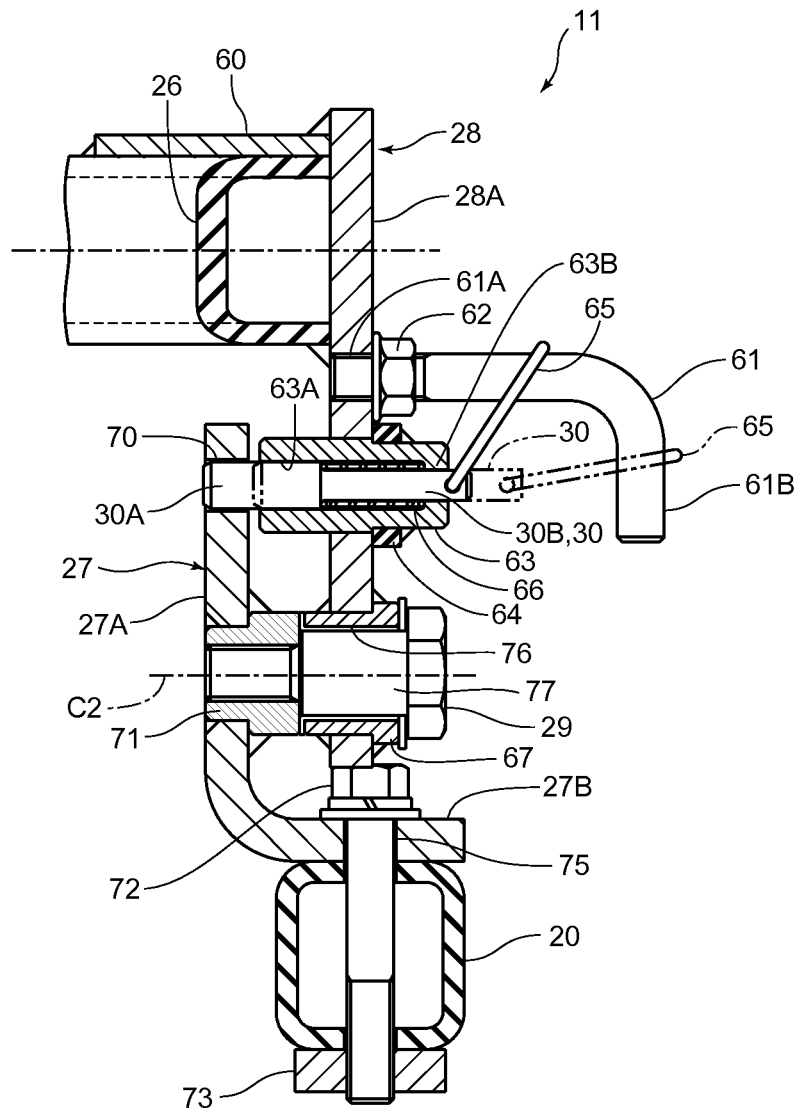
FIG. 13 is a cross sectional view taken along a cutout line XIII-XIII shown in FIG. 12(A).

FIGS. 12(A) and 12(B) show the second connection mechanism 11; wherein a left section 12(A) is a rear view of the lawn-mowing unit 2E in a view from a rear side, at the time when the lawn-mowing unit 2E is placed to the biased side position, and meanwhile a right section 12(B) is a rear view that shows the first bracket 27. FIG. 13 is a cross sectional view taken along a cutout line XIII-XIII shown in FIG. 12(A). As shown in FIG. 12 and FIG. 13, the second connection mechanism 11 includes; the first bracket 27 fixed to the casing frame 20, the second bracket 28 fixed to the deck arm 26, and the rotary shaft 29 that connects the first bracket 27 and the second bracket 28 fixed to the deck arm 26, in such a way as to be rotatable each other. The first bracket 27 is structured with a plate that is so bent as to be almost L-shaped, and an upper part of a raised section 27A (in the Z2 direction) is provided with a bore part 70. Below the bore part 70, a support shaft 71 having a flange is fixed. Moreover, a fixing section 27B extended in the X2 direction is shaped in a right-angle direction from the raised section 27A. The first bracket 27 is screw-fixed to a fixing plate 73, which is fixed to a bottom surface of the casing frame 20 by welding and the like, at the fixing section 27B by way of inserting a bolt 72 that passes through the fixing section 27B and the casing frame 20.

The second bracket 28 has a plate part 28A of an approximate deformed hexagonal shape, as shown in FIG. 12A, and the second bracket 28 is fixed to the deck arm 26 by the intermediary of a reinforcement plate 60, at an upper position of the plate part 28A. A hook pin 61, as a hook part, is fixed to the plate part 28A. The hook pin 61 is an almost L-shaped rod component, and one end of the hook pin 61 is provided with a screw part 61A that is screwed into the plate part 28A, and the screwed section is fastened by means of a nut 62 for reinforcement. The other end of the hook pin 61 is bent toward a lower side (in the Z1 direction) at a position that is distant from the plate part 28A in the X2 direction, so as to become a ring retaining part 61B. Below the fixing part of the hook pin 61 in the plate part 28A, a sleeve 63 is fixed by the intermediary of a washer 64, by welding and the like, in such a way that an end part of the sleeve 63 protrudes toward the first bracket 27. The sleeve 63 is provided with an internal sleeve part 63A, and a flange part 63B having a down-sized inner diameter is formed at an end part at the X2 side in the internal sleeve part 63A. Then, a pin 30 provided with a shoulder part is inserted in the sleeve 63.

In the pin 30, there are formed a shaft part 30A, which can be inserted into the bore part 70 of the first bracket 27, and a slender shaft part 30B. The shaft part 30A works as a locking component for hitching the first bracket 27 to the second bracket 28. In other words, the pin 30 becomes means for stopping a turn motion of the lawn-mowing unit 2E with respect to the deck arm 26. Between the internal sleeve part 63A of the sleeve 63 and the slender shaft part 30B, there is formed a gap in a radial direction, and a coil spring 66 as a biasing component is inserted in the gap. The coil spring 66 is placed between the flange part 63B of the sleeve 63 and an end part of the shaft part 30A of the pin 30, in order to bias the pin 30 toward the first bracket 27. The pin 30 can move backward and forward in an axis direction by way of the coil spring 66. Furthermore, at an end part of the pin 30 in the X2 direction, a ring 65 as a catch part for pulling back the pin 30 is installed, so as to be rotatable and swing-able. By way of catching the ring 65 with a finger and the like, and pulling it back outward (in the X2 direction), the pin 30 can be pulled out from the bore part 70. According to these steps, stopping a turn motion of the first bracket 27 with respect to the second bracket 28 is cancelled (as illustrated with two-dot chain lines in FIG. 13) At this time, hanging the ring 65 on the ring retaining part 61B of the pin 30 keeps the pin 30 being pulled out. Incidentally, a condition of the pin 30 being pulled out is illustrated with two-dot chain lines in FIG. 13. In the case of the lawn-mowing unit 2E shown in FIG. 12 and FIG. 13, the ring 65 is released from the ring retaining part 61B, the pin 30 is inserted in the bore part 70 of the first bracket 27.

In the second bracket 28, a sleeve 67 is fixed below the sleeve 63. A center of a bore part 76 of the sleeve 67 is consistent with a center of a bore part of the support shaft 71 of the first bracket 27, and the first bracket 27 and the second bracket 28 are connected to each other by means of fixing the rotary shaft 29 having a shoulder part, to the support shaft 71 through screw-fastening. Since there is formed a clearance between the bore part 76 of the sleeve 67 and a shaft part 77 of the rotary shaft 29, the first bracket 27 is connected to the second bracket 28 so as to be rotatable, by using the shaft part 77 as a rotary shaft. Moreover, the bore part 70 provided at the raised section 27A in the first bracket 27 is an elongate bore shaped so as to go along a concentric circle centering around an axis C2 of the sleeve 67 (refer to FIG. 12B). The fixing section 27B is provided with a hole 75 through which the bolt 72 is inserted.

As shown in FIG. 12B, the first bracket 27 is bilaterally symmetric with respect to a straight line C3 that passes through the axis C2. A center of the support shaft 71 and the bore part 70 in the right-and-left direction is located on the straight line C3. A hole 78 and another hole 79 are individually provided at both the right and left sides of the bore part 70 in the drawing. The bore part 70, the hole 78 and the hole 79 are so positioned as to have the same distance from the axis C2 of the support shaft 71, and an angle formed between either of the holes 78 and 79, and the straight line C3 is 'K' degrees. A width of the bore part 70 and a diameter of the holes 78 and 79 are sized in such a way that the shaft part 30A of the pin 30 can be inserted.

While the pin 30 is inserted in the bore part 70 that is an elongate bore, rotation of the first bracket 27 is restricted within a range of the bore part 70 by the pin 30. In other words, the lawn-mowing unit 2E can swing around the axis C2, which works as a center, within the range of the bore part 70. Moreover, when the pin 30 is pulled out from the bore part 70, the lawn-mowing unit 2E can freely swing. If the lawn-mowing unit 2E is tilted counterclockwise (in a direction for orienting the opening of the deck 22 to an outside of the of the carriage 4) under conditions where the pin 30 is pulled out from the bore part 70, and then a force of pulling back the pin 30 is weaken when the pin 30 meets the hole 79; the shaft part 30A of the pin 30 gets inserted into the hole 79 by means of a biasing force of the coil spring 66 so that the lawn-mowing unit 2E having the tilt is locked. In order to insert the pin 30 for sure, without having the pin 30 pass by a position of the hole 79, while the lawn-mowing unit 2E being tilted, the lawn-mowing unit 2E is further provided with a rotation restricting means.

The rotation restricting means includes slant parts 83 and 84 in the second bracket 28 and the fixing section 27B of the first bracket 27, as shown in FIG. 12A, wherein the fixing section 27B being so bent as to be almost L-shaped. At a lower section of the plate part 28A of the second bracket 28 (at an end part facing toward the fixing section 27B of the first bracket 27), the slant parts 83 and 84 are individually shaped at both the right and left sides. An angle formed between either of the slant parts 83 and 84 and a top surface of fixing section 27B is 'K' degrees. Therefore, a tilt angle of the first bracket 27 (the lawn-mowing unit 2E) with respect to the second bracket 28 (the deck arm 26) is restricted to 'K' degrees. The angle of 'K' degrees is consistent with the angle of 'K' degrees that is each angle of the holes 78 and 79 provided in the first bracket 27, with respect to the straight line C3. Therefore, when the lawn-mowing unit 2E is tilted outward (in the counterclockwise direction) at 'K' degrees with respect to the arm 7, the pin 30 can be inserted into the hole 79. When the lawn-mowing unit 2E is placed at the biased side position, the lawn-mowing unit 2E is moved up by way of grasping the handle 20A, under conditions where the pin 30 is pulled out from the bore part 70. Then, the lawn-mowing unit 2E rotates counterclockwise around the axis C2 while having the rear rollers 25 contact with the ground. Subsequently, when the lawn-mowing unit 2E becomes tilted at 'K' degrees with respect to the fixing section 27B, the slant part 83 contacts with the fixing section 27B, and the rotation position gets restricted there. If the pin 30 is inserted into the hole 79 under conditions where the slant part 83 contacts with the fixing section 27B, it becomes possible to keep the situation, i.e., in which the lawn-mowing unit 2E is tilted at 'K' degrees, by means of the pin 30. In the situation, the lawn-mowing unit 2E takes an outward posture that is a pose of the lawn-mowing unit 2E orienting its facing-the-ground surface (the opening of the deck 22) toward an outside the carriage 4. Incidentally, the angle of the slant parts 83 and 84 as well as the holes 78 and 79 can be chosen arbitrarily. The lawn-mowing unit 2D has a configuration of being bilaterally symmetrical to the lawn-mowing unit 2E. Therefore, the lawn-mowing unit 2D can also have the deck 22 take an outward posture, by way of the same operation as the lawn-mowing unit 2E carries out.

Figure 14:
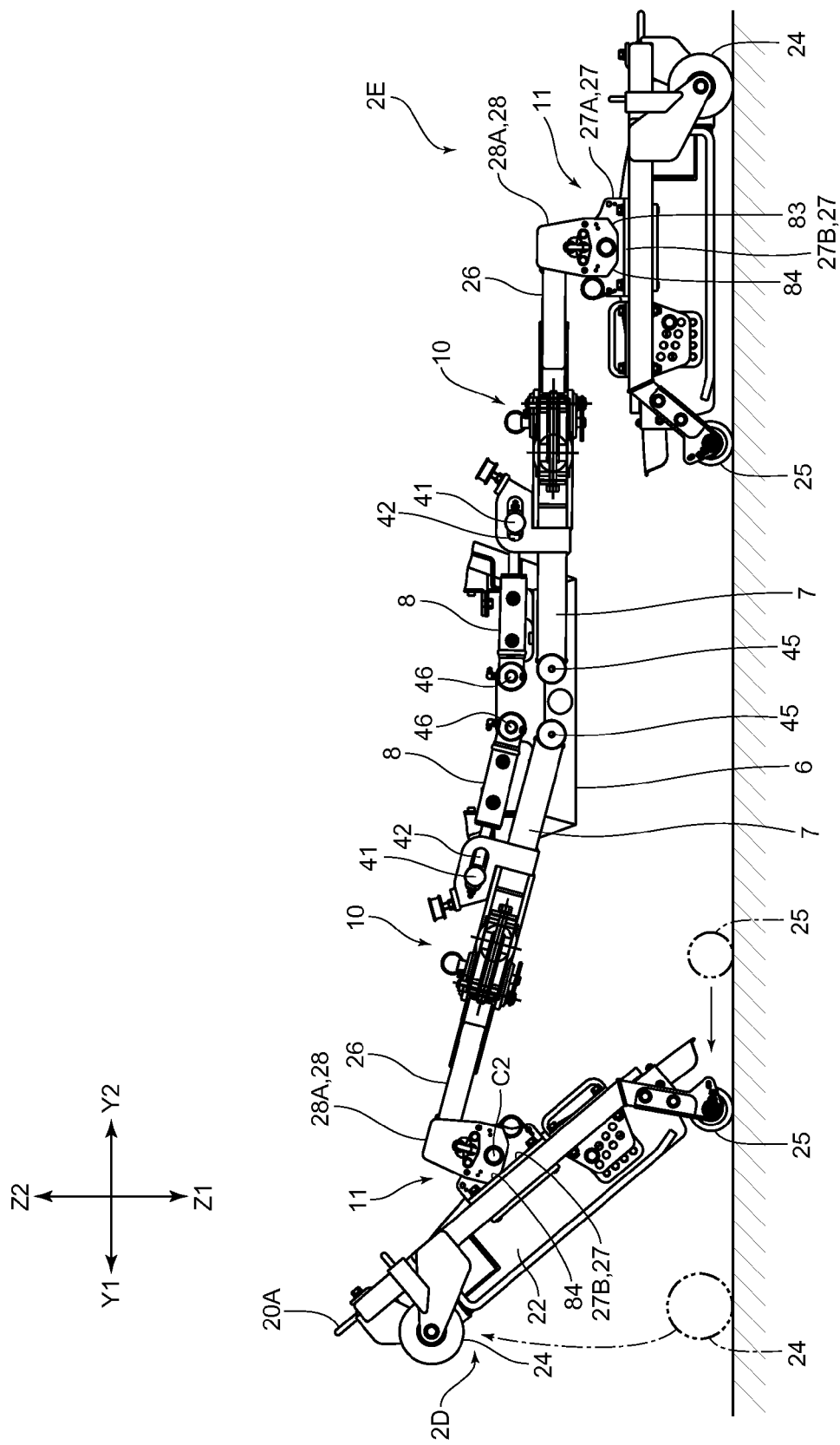
FIG. 14 is a rear view at a time when one lawn-mowing unit of the rear side is placed at the biased side position, and the other lawn-mowing unit is taking an outward posture, in a view from a rear side.

FIG. 14 is a rear view at the time when the lawn-mowing unit 2E is placed at the biased side position, and the lawn-mowing unit 2D is in a situation of taking an outward posture, in a view from a rear side. The lawn-mowing unit 2E is placed at the biased side position, and the front rollers 24 as well as the rear rollers 25 contact with the ground. At the time, lawn-mowing unit 2E is under conditions where the second connection mechanism 11 is in a situation as FIG. 12A and FIG. 13 show; and the connection shaft 41 of the up-and-down cylinder 8 is placed at a middle position in a longitudinal direction of the elongate hole 42 of the arm 7.

The lawn-mowing unit 2D is in the situation of having taken an outward posture, while orienting its facing-the-ground surface toward an outside; and the lawn-mowing unit 2D rotates until the fixing section 27B of the first bracket 27 contacts with the slant part 84 of the second bracket 28. The rear rollers 25 keep on contacting the ground while the lawn-mowing unit 2D shifts to the outward posture from the biased side position. Moreover, between the elongate hole 42 of the arm 7 and the connection shaft 41 of the up-and-down cylinder 8, play (a gap) is individually provided both in an elongating direction and in a contracting direction of the up-and-down cylinder 8. In other words, play (a gap) is provided between the elongate hole 42 and the connection shaft 41 at a Y2 side. Therefore, even though the lawn-mowing unit 2D is moved up, the arm 7 and the up-and-down cylinder 8 can be rotated clockwise by using the shaft 45 and the shaft 46 as rotation centers, respectively, without contracting the up-and-down cylinder 8. By means of the rotation of the arm 7 and the up-and-down cylinder 8, the lawn-mowing unit 2D can be tilted at an angle greater than the angle of 'K' degrees of the second connection mechanism 11 (refer to FIG. 12A). Moreover, since the lawn-mowing unit 2D can be rotated without contracting the up-and-down cylinder 8, it is possible to manually rotate the lawn-mowing unit 2D. In the same way as the lawn-mowing unit 2D, the lawn-mowing unit 2E can also shift to the outward posture from the biased side position. According to this arrangement, each facing-the-ground surface of the lawn-mowing units 2D and 2E can easily be shifted to take the outward posture manually, at the side positions of the carriage 4. As a result, the cutter blade 21 (refer to FIG. 4) located at a side of the facing-the-ground surface of the lawn-mowing units 2D and 2E can easily be replaced, and it is possible to easily and surely remove and clear grass clippings that adhere to an internal surface of the deck 22 bowl-shaped, from the side of the facing-the-ground surface.

As shown in FIG. 6, the lawn-mowing unit 2A and the lawn-mowing unit 2C located at both the right and left sides have an outward posture with a sufficient tilt angle at the time of traveling, and therefore maintenance work for a side of the facing-the-ground surface can be carried out under the conditions, by way of stopping the carriage 4. The lawn-mowing units 2A through 2C are not shifted by rotation to their biased side positions, and therefore it may not be needed to provide the first connection mechanism 10. Incidentally, when the lawn-mowing unit 2B located at the center position is equipped with the second connection mechanism 11, the opening of the deck 22 can be faced toward the front side under conditions where the lawn-mowing unit 2B is located at the moved-up position, and therefore maintenance work can easily be carried out. Incidentally, although the lawn-mowing unit 2A and the lawn-mowing unit 2C do not need to have the second connection mechanism 11 for their functions, placement of the second connection mechanism 11 onto these lawn-mowing units as well makes it possible to share the same components among the lawn-mowing units 2A through 2E.

Furthermore, it is possible to make an adjustment for an elevation of the cutter blade 21 from the ground surface, with respect to each of the lawn-mowing units 2A through 2E. An explanation is made on this issue with reference to FIG. 12A. A plate 90 is fixed to the casing frame 20, and in the meantime a plate 91 is fixed to the deck 22. In the plate 90, a plurality of holes 92 in two lines are provided in a slanted elevational direction, wherein the two lines are placed in a vertical direction. Meanwhile, in the plate 91, a plurality of holes 93 in multiple lines are provided in a horizontal direction, wherein the multiple lines (not illustrated) are placed in a vertical direction. Then, by combining one of the holes 92 and one of the holes 93 appropriately in order to fix the plate 90 and the plate 91 with a bolt 94, an elevation of the deck 22 with respect to the casing frame 20 can be changed. The plate 90, the plate 91 and the bolt 94 are provided at three sides; i.e., at a right side, a left side and a front side; of each lawn-mowing unit. By way of adjusting the elevation of the deck 22 with respect to the casing frame 20, the elevation of the cutter blade 21 from the ground surface can be adjusted so that a height of lawn-mowing can be adjusted.

Advantageous Effect of the Embodiment

In the lawn-mowing vehicle 1, the lawn-mowing units 2D and 2E are connected to the carriage 4 by the intermediary of the arm 7; and by way of activating the up-and-down cylinder 8 that connects the arm 7 and the carriage 4, the lawn-mowing units 2D and 2E can be shifted between the moved-down position as a position at the time of lawn-mowing and the moved-up position as a position for driving the carriage in a time period when no lawn-mowing is carried out. Then, the lawn-mowing vehicle 1 includes the first connection mechanism 10 that makes it possible to rotate the lawn-mowing units 2D and 2E in a plane parallel with the ground surface, and connects each of the lawn-mowing units 2D and 2E to the arm 7, in such a way that the lawn-mowing units 2D and 2E can be shifted by rotation between their work positions at the time of lawn-mowing and the biased side positions that are biased toward the sides of the carriage 4, being away from the work positions. Furthermore, the lawn-mowing vehicle 1 includes the second connection mechanism 11 for connecting each of the lawn-mowing units 2D and 2E to the first connection mechanism 10 so as to be rotatable, in such a way that each of the lawn-mowing units 2D and 2E placed at the biased side positions can be shifted from a facing-the-ground posture, which is a pose of the facing-the-ground surface to face the ground, to an outward posture, which is a pose of the facing-the-ground surface to orient toward an outside of the carriage 4. Then, a connection part for connecting the arm 7 to the connection shaft 41 placed at the movable end part of the up-and-down cylinder 8 is prepared as the elongate hole 42 that is elongated along the movement direction of the up-and-down cylinder 8.

According to the configuration described above, in the lawn-mowing vehicle 1, the lawn-mowing units 2D and 2E positioned below the carriage 4 can be shifted by rotation from the moved-down position at the time of lawn-mowing to the biased side positions of the carriage 4, and furthermore the facing-the-ground surface of the lawn-mowing units 2D and 2E can manually be shifted to take an outward posture that is a pose for facing an outside the carriage 4. As a result, it is possible to easily carry out replacement of the cutter blade 21 located at the side of the facing-the-ground surface of the lawn-mowing units 2D and 2E, and removing and clearing lawn and the like that adhere. According to the conventional technology, no play is provided at a connection part for connecting an arm and an up-and-down cylinder, and therefore a load for a lawn-mowing unit to take an outward posture is so large that it is difficult to take the outward posture manually. In the meantime, according to the present embodiment, the connection part for connecting the movable end part of the up-and-down cylinder 8 (the connection shaft 41) and the arm 7 is provided with the elongate hole 42 to have play between the elongate hole 42 and the up-and-down cylinder 8. Accordingly, the movable end part of the up-and-down cylinder 8 can move within a range of the elongate hole, and therefore the deck 22 of the lawn-mowing units 2D and 2E can easily be moved up even manually so as to take an outward posture.

Moreover, owing to the play by the elongate hole 42, which exists between the arm 7 and the movable end part of the up-and-down cylinder 8, it becomes possible to absorb vertical movement of the deck 22 caused by any slant and undulation in the horizontal direction on the ground, at the time of lawn-mowing.

Furthermore, the lawn-mowing vehicle 1 includes the front rollers 24 and the rear rollers 25 that support the lawn-mowing units 2D and 2E against the ground at the time of lawn-mowing, while the rollers being rotatable in a traveling direction of the carriage 4. The rear rollers 25 are located at positions where they contact with the ground at the time when the lawn-mowing units 2D and 2E get shifted by rotation from the facing-the-ground posture to the outward posture. Therefore, at the time of moving up the deck 22 to the outward posture, the principle of leverage is applied; wherein the rear rollers 25 work as the fulcrum, the second connection mechanism 11 is the point of load, and the handle 20A is the point of effort; in order to reduce the moving-up force to make the moving-up work of the deck 22 still easier.

Moreover, a longitudinal direction of the arm 7 is placed in a direction perpendicular to the axis laid along the front-and-back direction of the carriage 4 (the axis line C1), and meanwhile the biased side positions are positions where the rotary shaft 29 of the second connection mechanism 11 in the lawn-mowing units 2D and 2E is oriented so as to be perpendicular to the longitudinal direction of the arm 7. According to this arrangement, when the lawn-mowing units 2D and 2E are located at the biased side positions, the front rollers 24 and the rear rollers 25 are placed at positions that are shifted 90 degrees by rotation, in comparison with the positions of the front rollers 24 and the rear rollers 25 at the time of lawn-mowing. In other words, the front rollers 24 and the rear rollers 25 are placed in parallel with the axis line C1, so that it becomes easy for the front rollers 24 and the rear rollers 25 to contact with the ground, and a posture of the lawn-mowing units 2D and 2E contacting with the ground gets stabilized. Furthermore, the opening of the deck 22, i.e., the facing-the-ground surface, of the lawn-mowing units 2D and 2E is placed in parallel with the axis line C1, and therefore maintenance work for an internal part of the deck 22 can easily be carried out.

Moreover, the lawn-mowing vehicle 1 has the rotation restricting means for restricting a rotation range of the lawn-mowing units 2D and 2E by use of the second connection mechanism 11. The rotation restricting means includes the slant parts 83 and 84 in the second bracket 28 and the fixing section 27B of the first bracket 27, wherein the fixing section 27B is so bent as to be almost L-shaped. Rotation of the lawn-mowing units 2D and 2E is restricted when the slant parts 83 and 84 of the second bracket 28 contact with the fixing section 27B of the first bracket 27. The second connection mechanism 11 includes the first bracket 27 fixed to the casing frame 20 of the lawn-mowing units 2D and 2E, and the second bracket 28 fixed to the deck arm 26 of the first connection mechanism 10; and the second connection mechanism 11 further includes the shaft part (the shaft part 77 of the rotary shaft 29) for supporting the first bracket 27 with the second bracket 28, so as to be rotatable. The second bracket 28 is provided with the pin 30 that can move backward and forward, in a direction toward a side where the first bracket 27 is located. Meanwhile, there are formed pin-insertion holes (the holes 78 and 79) in the first bracket 27; wherein one of the pin-insertion holes faces the pin 30 when the lawn-mowing units 2D and 2E are rotated until the rotation restricting means restricts the rotation, and at the time, the pin 30 advances toward a side of the first bracket 27 to get inserted into the pin-insertion hole.

Accordingly, when the first bracket 27 is rotated in relation to the second bracket 28 so as to insert the pin 30, provided in the second bracket 28, into one of the pin-insertion holes, provided in the first bracket 27 at the predetermined angle of 'K' degrees; the deck 22 can be shifted by rotation to have an outward posture with the predetermined tilt angle 'K' degrees in relation to the first connection mechanism 10 so as to maintain the posture. At the time of lawn-mowing, if the pin 30 is inserted in the bore part 70 (elongate hole) of the first bracket 27, the lawn-mowing units 2D and 2E can cope with a slope and undulation of the ground in the front-back direction of the carriage 4, within an allowable rotation range of the bore part 70.

Moreover, when the lawn-mowing units 2D and 2E are shifted by rotation to take an outward posture, almost no load arises except the weight of the lawn-mowing units 2D and 2E, within the range of the rotation restriction means. Therefore, the lawn-mowing units 2D and 2E can easily be rotated to take an outward posture. Moreover, since the elongate hole 42 is provided to the connection part for connecting the movable end part of the up-and-down cylinder 8 (the connection shaft 41) and the arm 7, the lawn-mowing units 2D and 2E can manually be shifted by rotation to take an outward posture with which maintenance work can be carried out, by collectively making use of the rotation restriction means and an effect of the play by the elongate hole 42. Although, in the embodiment described above, the rotation restriction means is configured with the slant parts 83 and 84 of the second bracket 28, and the fixing section 27B of the first bracket 27, wherein the fixing section 27B is so bent as to be almost L-shaped, the rotation restriction means is not limited to the above configuration. For example, applied may be another configuration in which the rotation is restricted by making a contact between the casing frame 20 and the arm 7.

Furthermore, the lawn-mowing vehicle 1 includes; a biasing means (the coil spring 66) for biasing the pin 30 toward a side of the first bracket; a catch part (the ring 65) that is provided to the pin 30, and can be caught by a finger when the pin 30 is moved against a biasing force in a direction for getting away from the first bracket; and a hook part (the hook pin 61) that is provided to the second bracket, and to which the ring 65 is hitched under conditions where the pin 30 is pulled out from the pin-insertion holes (the holes 78 and 79) shaped in the first bracket, so that it becomes possible to prevent the pin 30 from moving to the side of the first bracket 27.

Accordingly, if the pin 30 is pulled out from the side of the first bracket 27, and the ring 65 is hitched to the hook pin 61, the first bracket 27 can easily be rotated in relation to the second bracket 28. Meanwhile, if the ring 65 is released from being hitched to the hook pin 61 at a predetermined position, the pin 30 can be inserted into the holes 78 and 79, as the pin-insertion holes, of the first bracket 27, by the biasing force of the coil spring 66.

Incidentally, the present invention is not limited to the embodiment described above, and any modification, improvement, and the like in a scope, where an objective of the present invention can be achieved, are included in the present invention. In the present embodiment, the arm 7 is so placed as to have its longitudinal direction laid perpendicular to the axis line C1 that goes along the front-and-back direction of the carriage 4. In the meantime, the biased side positions are positions where the rotary shaft 29 of the second connection mechanism 11 in the lawn-mowing units 2D and 2E is oriented so as to be perpendicular to the longitudinal direction of the arm 7. Nevertheless, the longitudinal direction of the arm 7 may be so placed as to be tilted forward with respect to the axis line C1 that goes along the front-and-back direction of the carriage 4. Even in this case, the elongate hole 42 is provided to the connection part for connecting the movable end part of the up-and-down cylinder 8 (the connection shaft 41) and the arm 7, and therefore the deck 22 of the lawn-mowing units 2D and 2E can easily be moved up even manually so as to take an outward posture. Moreover, although the lawn-mowing vehicle 1 equipped with the lawn-mowing units 2D and 2E at the rear side is described, for example, in the embodiment described above, the present invention can also be applied to a lawn-mowing vehicle in which the lawn-mowing units 2A through 2C at the front side are placed below the carriage 4. Furthermore, the present invention can also be applied to a configuration in which only one lawn-mowing unit is provided at the rear side.

Moreover, although the lawn-mowing units 2D and 2E are displaced to the biased side positions at a moved-down elevation at the time of lawn-mowing, the lawn-mowing units 2D and 2E may be displaced to the biased side positions at a time when the lawn-mowing units 2D and 2E are at their moved-up positions for traveling.

Moreover, although the lawn-mowing units 2D and 2E include the rotation restricting means provided to the second connection mechanism 11, the rotation restricting means may be eliminated, and the rotation can be restricted by means of the elongate hole 42 provided to the connection part for connecting the up-and-down cylinder 8 and the arm 7. It may be provided the elongate hole 42 in the up-and-down cylinder 8 and the connection shaft 41 in the arm 7. The rear roller may be one long roller, not a pair of rear rollers 25.

What is claimed is:

1. A lawn-mowing vehicle comprising:
   a carriage;
   an up-and-down cylinder connected to the carriage;
   an arm connected to the up-and-down cylinder via an elongate hole;
   a lawn-mowing unit connected to the up-and-down cylinder, the lawn-mowing unit being movable between a moved-down position for lawn-mowing, and a moved-up position for driving while not lawn-mowing, by activating the up-and-down cylinder connected between the arm and the carriage;
   rollers connected to the lawn-mowing unit and supporting the lawn-mowing unit relative to the ground while lawn-mowing and rotating in a traveling direction of the carriage;
   a deck arm connected to the lawn-mowing unit;
   a first connection mechanism including a first rotary shaft which rotatably connects the deck arm to the arm so that the lawn-mowing unit is manually rotatable in a plane parallel to the ground while the rollers contact the ground between the moved-down position and a biased side position that is laterally shifted to a side of the carriage; and
   a second connection mechanism including a second rotary shaft which rotatably connects the deck arm to the lawn-mowing unit so that the lawn-mowing unit is manually rotatable while in the biased side position between a facing-the-ground posture and an outward posture, the facing-the-ground posture having the lawn-mowing unit in a prone orientation, the outward posture having the lawn-mowing unit in an upright orientation.

2. The lawn-mowing vehicle according to claim 1, wherein
   the rollers are located at positions where the rollers contact with the ground at the time when the lawn-mowing unit is rotated from the facing-the-ground posture to the outward posture.

3. The lawn-mowing vehicle according to claim 1, wherein
   a longitudinal direction of the arm is perpendicular to an axis along a front-and-back direction of the carriage, and
   in the biased side position, the second rotary shaft is perpendicular to the longitudinal direction of the arm.

4. The lawn-mowing vehicle according to claim 2, wherein
   a longitudinal direction of the arm is perpendicular to an axis along a front-and-back direction of the carriage, and
   in the biased side position, the second rotary shaft is perpendicular to the longitudinal direction of the arm.

5. The lawn-mowing vehicle according to claim 1, further comprising:
   a rotation restricting means for restricting a rotation range of the lawn-mowing unit by use of the second connection mechanism;
   wherein the second connection mechanism includes:
   a first bracket fixed to the lawn-mowing unit, and a second bracket fixed to the first connection mechanism; and
   a shaft for supporting the first bracket with the second bracket, so as to be rotatable;

the second bracket is provided with a pin that moves backward and forward, in a direction toward a side where the first bracket is located; and the first bracket includes a pin-insertion hole;

wherein the pin-insertion hole faces the pin when the lawn-mowing unit is rotated until the rotation restricting means restricts the rotation, and at the time, the pin advances toward a side of the first bracket to become inserted into the pin-insertion hole.

6. The lawn-mowing vehicle according to claim 2 further comprising:

a rotation restricting means for restricting a rotation range of the lawn-mowing unit by use of the second connection mechanism;

wherein the second connection mechanism includes:

a first bracket fixed to the lawn-mowing unit, and a second bracket fixed to the first connection mechanism; and a shaft for supporting the first bracket with the second bracket, so as to be rotatable;

the second bracket is provided with a pin that moves backward and forward, in a direction toward a side where the first bracket is located; and the first bracket includes a pin-insertion hole;

wherein the pin-insertion hole faces the pin when the lawn-mowing unit is rotated until the rotation restricting means restricts the rotation, and at the time, the pin advances toward a side of the first bracket to become inserted into the pin-insertion hole.

7. The lawn-mowing vehicle according to claim 3 further comprising:

a rotation restricting means for restricting a rotation range of the lawn-mowing unit by use of the second connection mechanism;

wherein the second connection mechanism includes:

a first bracket fixed to the lawn-mowing unit, and a second bracket fixed to the first connection mechanism; and a shaft for supporting the first bracket with the second bracket, so as to be rotatable;

the second bracket is provided with a pin that moves backward and forward, in a direction toward a side where the first bracket is located; and the first bracket includes a pin-insertion hole;

wherein the pin-insertion hole faces the pin when the lawn-mowing unit is rotated until the rotation restricting means restricts the rotation, and at the time, the pin advances toward a side of the first bracket to get inserted into the pin-insertion hole.

8. The lawn-mowing vehicle according to claim 4 further comprising:

a rotation restricting means for restricting a rotation range of the lawn-mowing unit by use of the second connection mechanism;

wherein the second connection mechanism includes:

a first bracket fixed to the lawn-mowing unit, and a second bracket fixed to the first connection mechanism; and a shaft for supporting the first bracket with the second bracket, so as to be rotatable;

the second bracket is provided with a pin that moves backward and forward, in a direction toward a side where the first bracket is located; and the first bracket includes a pin-insertion hole;

wherein the pin-insertion hole faces the pin when the lawn-mowing unit is rotated until the rotation restricting means restricts the rotation, and at the time, the pin advances toward a side of the first bracket to get inserted into the pin-insertion hole.

9. The lawn-mowing vehicle according to claim 5 further comprising:

a biasing means for biasing the pin toward a side of the first bracket;

a catch that is provided to the pin, and engages a finger when the pin is moved against a biasing force in a direction away from the first bracket; and a hook that is provided to the second bracket, and to which the catch is hitched when the pin is pulled out from the pin-insertion hole, so that the pin is prevented from moving to the side of the first bracket.

10. The lawn-mowing vehicle according to claim 6 further comprising:

a biasing means for biasing the pin toward a side of the first bracket;

a catch that is provided to the pin, and engages a finger when the pin is moved against a biasing force in a direction away from the first bracket; and a hook that is provided to the second bracket, and to which the catch is hitched when the pin is pulled out from the pin-insertion hole, so that the pin is prevented from moving to the side of the first bracket.

11. The lawn-mowing vehicle according to claim 7 further comprising:

a biasing means for biasing the pin toward a side of the first bracket;

a catch that is provided to the pin, and engages a finger when the pin is moved against a biasing force in a direction away from the first bracket; and a hook that is provided to the second bracket, and to which the catch is hitched when the pin is pulled out from the pin-insertion hole, so that the pin is prevented from moving to the side of the first bracket.

12. The lawn-mowing vehicle according to claim 8 further comprising:

a biasing means for biasing the pin toward a side of the first bracket;

a catch that is provided to the pin, and engages a finger when the pin is moved against a biasing force in a direction away from the first bracket; and a hook that is provided to the second bracket, and to which the catch is hitched when the pin is pulled out from the pin-insertion hole, so that the pin is prevented from moving to the side of the first bracket.

* * * * *